US006961066B2

(12) United States Patent
James

(10) Patent No.: US 6,961,066 B2
(45) Date of Patent: Nov. 1, 2005

(54) AUTOMATIC COLOR ADJUSTMENT FOR DIGITAL IMAGES

(75) Inventor: Brian G. James, Vernon (CA)

(73) Assignee: Athentech Technologies, Inc., Calgary (CA)

( * ) Notice: Subject to any disclaimer, the term of this patent is extended or adjusted under 35 U.S.C. 154(b) by 180 days.

(21) Appl. No.: 10/693,320

(22) Filed: Oct. 23, 2003

(65) Prior Publication Data

US 2004/0125112 A1 Jul. 1, 2004

Related U.S. Application Data

(63) Continuation of application No. 09/548,755, filed on Apr. 13, 2000, now Pat. No. 6,677,959.
(60) Provisional application No. 60/129,041, filed on Apr. 13, 1999.

(51) Int. Cl.$^7$ .............................. G09G 5/02; G06K 9/00; G06F 3/08; H04N 1/46
(52) U.S. Cl. ...................... 345/589; 345/589; 345/581; 345/597; 345/606; 345/617; 345/426; 345/428; 348/672; 348/661; 358/518; 358/522; 358/525; 382/162; 382/167; 382/274
(58) Field of Search .............................. 345/426–428, 345/581, 586, 588–593, 597, 600, 604, 606, 616–618, 690–694; 348/661, 672, 179–181; 358/517–522, 525, 527; 382/162–167, 254, 260, 265, 300, 274–276

(56) References Cited

U.S. PATENT DOCUMENTS 3,684,825 A   8/1972  Dischert et al. ......... 178/5.4 R 4,488,245 A   12/1984  Dalke et al. ................ 364/498

(Continued)

FOREIGN PATENT DOCUMENTS

EP   0357385 A3   3/1990   ............ H04N/1/46
EP   0427564 A3   5/1991   ............ H04N/5/20

(Continued)

OTHER PUBLICATIONS

PerfectPhoto User's Guide from IBM PerfectPhoto Image Editor, Version 1.0, 1998.
Digital ROC—Software Plug–in User Guide from Applied Science Fiction, Inc. 2002 (PN 104290 Rev 1).
Digital SHO—Software Plug–in User Guide from Applied Science Fiction, Inc. 2002 (PN 104292 Rev 1).

*Primary Examiner*—Matthew C. Bella
*Assistant Examiner*—Wesner Sajous
(74) *Attorney, Agent, or Firm*—Sheridan Ross PC

(57) ABSTRACT

A method is provided for automatically adjusting the color of a digital image. In one aspect, an strength offset is determined to automatically remove gray from a distorted image. In an other aspect applied independently or after gray removal, scaling factors are automatically determined to adjust the image to conform to empirically determined optimal brightening of the image. Using a determination of color dot maximums and a function which ensures constraint within the dynamic range, scaling factors are established which correspond to the strength values of each dot maximum and which are applied to each of the dot's R,G and B to maintain ratios therebetween and thus maintain the true color. The function for establishing the scaling factors is interpolated from a nominal function and a target average strength for the image.

17 Claims, 22 Drawing Sheets

U.S. PATENT DOCUMENTS

| | | | |
|---|---|---|---|
| 4,736,244 A | 4/1988 | Shiota et al. | 358/76 |
| 4,864,392 A | 9/1989 | Sato | 358/80 |
| 4,931,864 A | 6/1990 | Kawamura et al. | 358/80 |
| 5,042,078 A | 8/1991 | Oshikoshi et al. | 382/54 |
| 5,189,511 A | 2/1993 | Parulski et al. | 358/80 |
| 5,223,892 A | 6/1993 | Ikenoue et al. | 355/77 |
| 5,309,243 A | 5/1994 | Tsai | 348/221 |
| 5,329,385 A | 7/1994 | Washio | 358/515 |
| 5,353,095 A | 10/1994 | Terashita | 355/38 |
| 5,543,820 A | 8/1996 | Edgar | 345/153 |
| 5,544,258 A | 8/1996 | Levien | 382/169 |
| 5,649,072 A | 7/1997 | Balasubramanian | 395/109 |
| 5,650,942 A | 7/1997 | Granger | 364/526 |
| 5,661,575 A | 8/1997 | Yamashita et al. | 358/519 |
| 5,687,300 A | 11/1997 | Cooper | 395/109 |
| 5,790,282 A | 8/1998 | Hayashi et al. | 358/520 |
| 5,793,340 A | 8/1998 | Morita et al. | 345/7 |
| 5,854,882 A | 12/1998 | Wang | 395/109 |
| 5,870,077 A | 2/1999 | Dillinger et al. | 345/153 |
| 5,905,820 A | 5/1999 | Cushman et al. | 382/299 |
| 5,923,383 A | 7/1999 | Kim | 348/672 |
| 5,949,556 A | 9/1999 | Tamai | 358/518 |
| 5,982,926 A | 11/1999 | Kuo et al. | 382/167 |
| 6,005,968 A | 12/1999 | Granger | 382/162 |
| 6,028,646 A | 2/2000 | Jeong et al. | 348/645 |
| 6,195,204 B1 | 2/2001 | Nalwa | 359/403 |
| 6,289,119 B1 * | 9/2001 | Nagata | 382/162 |
| 6,456,323 B1 | 9/2002 | Mancuso et al. | 348/218 |
| 6,459,495 B1 | 10/2002 | Silverbrook | 358/1.09 |
| 6,462,835 B1 * | 10/2002 | Loushin et al. | 358/1.9 |
| 6,507,372 B1 * | 1/2003 | Kim | 348/630 |
| 6,535,301 B1 | 3/2003 | Kuwata et al. | 358/1.9 |
| 6,573,932 B1 | 6/2003 | Adams, Jr. et al. | 348/224.1 |
| 6,580,825 B2 * | 6/2003 | Bhaskar | 382/169 |
| 6,611,613 B1 * | 8/2003 | Kang et al. | 382/118 |
| 6,633,341 B2 | 10/2003 | Su | 348/602 |
| 6,677,959 B1 * | 1/2004 | James | 345/660 |
| 2000/0015199 | 1/2000 | Lee et al. | 345/88 |

FOREIGN PATENT DOCUMENTS

| | | | | |
|---|---|---|---|---|
| EP | 0603908 A3 | 2/1996 | | H04N/1/40 |
| EP | 0838942 A2 | 4/1998 | | H04N/1/407 |
| EP | 1063840 A2 | 12/2000 | | H04N/1/60 |
| EP | 1067804 A1 | 1/2001 | | H04N/9/68 |
| GB | 2276511 | 9/1994 | | H04N/1/46 |
| WO | WO 86/06907 | 11/1986 | | H04N/1/46 |

* cited by examiner pbox.Picture = LoadPicture(file_in)
    a rectangular picture of columns and rows is displayed For icol = 1 To pbox.ScaleWidth
    loops through the columns of the image, For irow = 1 to pbox.ScaleHeight
        loops through the rows of the image color = pbox.Point(icol,irow)
            the color of the point at current column, row.

blue = color / 65536
                This sets blue to the most significant byte (division by 256 * 256)

color = color mod 65536
                This keeps only the 2 least significant bytes (mod of 256 * 256)

green = color / 256
                This sets green to the (next) most significant byte (division by 256)

red = color mod 256
                This sets red to the least significant byte (modulus of 256)

strength = red

If strength < green Then strength = green

If strength < blue Then strength = blue
            the dot maximum is found corr = corra(strength)
            Lookup correction for that value of dot maximum then correct RGB in the dot red = red * corr green = green * corr blue = blue * corr
            Red, green, blue are now corrected to desired values pbox.PSet(icol,irow),RGB(red,green,blue)
            Put the adjusted and corrected dot back into the image on the screen Next irow
        Get next row dot in the column Next icol
    Get next image column of dots

*Fig. 2*

Assuming the area was selected so that xdwn is less than xup x1 = xdwn +1 x2 = xup -1 y1 = ydwn +1 y2 = yup -1

This Statement Ends the loop limit determination

For icol = x1 To x2

For irow = y1 to y2

The next 5 lines determine the color values (RGB)

color = pbox.Point(icol,irow)

blue = color / 65536 color = color mod 65536 green = color / 256 red = color mod 256

Find the dot Maximum strength = red

If strength < green Then strength = green

If strength < blue Then strength = blue

The next line builds the histogram hist(strength) = hist(strength) + 1 hist is an array (look up table) that stores the histogram counts

Next irow

Next icol

Find the minimum and maximum strengths, <u>in some statistical sense</u>, recorded stored in the histogram look up table (the array hist()).Creating a second look up table with the running totals of the histogram:

hsum(0) = hist(0)

hsum is the look up table used to hold the running total of the histogram first (zeroth) running total is the first (zeroth) histogram element For indx = 1 To drmx indx is an index that runs from 1 (not 0) to the dynamic range maximum hsum(indx) = hsum(indx - 1) + hist(indx)

the running total is calculated as previous running total plus next value

Next indx

*Fig. 7a*

Code for histogram look-up table hsum(0) = hist(0)

hsum is the look up table used to hold the running total of the histogram first (zeroth) running total is the first (zeroth) histogram element

For indx = 1 To drmx

Indx is an index that runs from 1 (not 0) to the dynamic range maximum hsum(indx) = hsum(indx - 1) + hist(indx)

the running total is calculated as previous running total plus next value

Next indx

**p002 = 0.02 * hsum(drmx) wherein** result is 2% of the total count and hsum(drmx) is the last running total (the total) of the histogram counts

**p098 = 0.98 * hsum(drmx)**

result is 98% of the total count, The next step is to find the index values corresponding to the 2% and 98% occurrence in the histogram.

i002 = -1; i098 = -1 these variables will hold the indices at the 2% and 98% level, for now they are set to -1

For indx = 0 to drmx the loop runs over all the strength values if hsum(indx) < p002 then i002 = indx when the running total is less than 2% total then store it (stop storing it when it is over 2%)

if hsum(indx) < p098 then i098 = indx when the running total is less than 98% total then store it (stop storing it when it is over 98%)

Next indx

Now, the histogram minimum and maximum values are set with a check to ensure that they are reasonable.

hmin = i002 + 1 hmin is set to 2% level strength index + 1 for reasons of symmetry

If hmin < 1 then hmin = 1 hmin is forced to be no less than 1 hmax = i098 hmax is set to 98% occurrence level of strength index

If hmax > drmx - 1 then hmax = drmx - 1 hmax is forced to be no more than dynamic range limit - 1 (254)

*Fig. 7b*

Input Image

Brightened

Bright 80%
Contrast

Bright 80%
Saturation

Virtual Flash
Output Image
Full Dyn Range

Virtual Flash
Output Image
Apply Fig. 8
curve

Fig. 10a Input Image
Fig. 10b PRIOR ART Brightened
Fig. 10c PRIOR ART Bright 60% Contrast
Fig. 10d PRIOR ART Bright 60% Saturation 15%
Fig. 10e Virtual Flash Output Image Full Dyn Range
Fig. 10f Virtual Flash Output Image Apply Fig. 8 curve Input Image Forensic Flash Output Image Input Image Forensic Flash Output Image Input Image Forensic Flash
Output Image Input Image Forensic Flash Output Image
Pick Snow Forensic Flash Output Image
Pick Face

AUTOMATIC COLOR ADJUSTMENT FOR DIGITAL IMAGES

CROSS REFERENCE TO RELATED APPLICATION

This application is a continuation in part of U.S. patent application Ser. No. 09/548,755 entitled—VIRTUAL TRUE COLOR LIGHT AMPLIFICATION, filed—Apr. 13, 2000 now U.S. Pat. No. 6,677,959 and which claims priority of U.S. Provisional Patent application No. 60/129,041, filed Apr. 13, 1999. The entire disclosures of these applications are incorporated by reference herein in their entirety.

FIELD OF THE INVENTION

The present invention related to methods for enhancing digital color images. More particularly, the method automatically selects the extent to which the strength of light is amplified in correcting color digital images without exceeding the inherent dynamic range for the image. Further, an automated method corrects faded or washed out images.

BACKGROUND OF THE INVENTION

Light Amplification of Images

If one were to photograph the stain glass windows of a Cathedral, the resulting image would be typically too dark for modern tastes. The beauty of the actual stained glass is lost. Further, a photographer can increase depth of field of an image by reducing the device's aperture, but light collection is sacrificed and can also result in a dark image. Further, as a still image device is capable of only HSV color space, Kuo then isolates and removes the color information (Hue) from the remaining image components (saturation and intensity). Kuo suggests that the components of saturation and intensity can be enhanced without introducing distortion into the color or Hue component. Kuo's color image is represented by a plurality of pixels in HSV color space. Once transformed, Kuo inverse transforms HSV back to RGB color space, all the while claiming this to be efficient. In the preferred embodiment, Kuo adjusts intensity (V) and saturation (S). In summary, Kuo first transforms RGB to HSV color space, applies two sequential transformation functions to V and S respectively, and finally inverse transforms the altered HSV back to RGB for display.

Respectfully, Applicant asserts that manipulation of the saturation does affect the color and thus the Kuo technique does not result in true color enhancement. Color photos have three degrees of freedom, being R,G and B, where as black and white photos only have one. Any transformation of the three values results in three more values, each of which contains a color component and not merely a single color value (i.e. hue) and two other independent structural components (i.e. saturation and intensity). Hue may be a more extreme sense of color than saturation, but saturation is still a color component. Adjusting a dot's saturation results in a change in the proportions of RGB in the dot and hence its color. If the saturation is changed, say as part of brightening the image, the result is not the same as if the recording device or camera had obtained the image directly from the real world subject under brighter conditions, or more exposure.

Further, note that Kuo emphasizes and attempts to minimize the computational overhead or expense. Unfortunately, Kuo introduces two RGB-HSV and HSV-RGB transformations in addition to whatever adjustments (preferably two) Kuo makes to the HSV pixel. A transformation from RGB to HSV color space, and back again, involves the use of computation-intensive mathematical functions.

Further, the foregoing methodologies rely on significant user input and skill.

Automatic Correction

It is known to automatically corrects tone values of digitally stored images as disclosed in U.S. Pat. No. 5,544,258 to Levien. A histogram of the image is processed by adding a constant, applying a non-linear function to each value, and digital filtering. Application of a square root function assures that small histogram values have more contribution to the final curve, and that large histogram values have less contribution to the final tone curve, relatively. The processed histogram is integrated and then normalized for a tone correction function. This tone correction function can be applied to the average histogram of the respective individual color planes. It is applicant's view that this correction does not maintain the true colors through the correction nor deal with limitations of dynamic range.

Accordingly, there is demonstrated a need for an automatic and computationally efficient process which is capable of maintaining true color for each dot during enhancement of an image. Automation avoids the barrier of a steep learning curve to effectively adjust images for more a pleasing effect. The present invention addresses these problems by providing a technique which is both automated and which, no matter how much image-brightening is needed or what the nature of that brightening is, the color of all dots in the image are preserved.

SUMMARY OF THE INVENTION

The present invention applies the virtual true color correction techniques of the co-pending application in an automated methodology for further simplifying color light amplification of digital photographs without color distortion. In one embodiment, the present invention automatically applies an average strength value for a digital image and determines a corresponding correction function for maximal amplification without color distortion. In another embodiment, the method is further improved through automatic compensation for distorted or faded digital photographs.

In one broad aspect of the invention, automatic adjustment of the color of a digital image comprises: establishing an original histogram of dot maximums for the plurality of color dots within the original image and an original average strength thereof; amplifying each dot maximum with a scaling factor selected from a continuous scaling function to obtain a scaled dot maximum which is less than or equal to the maximum of the dynamic range; establishing a corrected histogram of scaled dot maximums and a corrected average strength thereof; interpolating a target scaling factor from a target average strength, the corrected average strength and the original average strength for each dot maximum; and creating the adjusted image without color distortion by applying the target scaling factors to each color dot's R, G and B strength values so that a histogram of the adjusted image has the target average strength and that the ratios of the strength values between R, G and B for the color dot remain the same after scaling as they were before scaling.

In some cases it is preferable to automatically correct the image for removing excessive gray before automatic adjustment of the color further comprising: establishing a supplied histogram of R, G, or B strength values for each color dot within the supplied image; determining a offset strength value between the minimum of the dynamic range of the system and a minimum threshold strength value of the supplied histogram; and subtracting the offset strength value from each R, G, and B value for forming the original image for automatic correction thereof.

BRIEF DESCRIPTION OF THE DRAWINGS

Virtual True Color Light Amplification

In the Figures, several digital images are presented. As this application is directed to the enhancement of color digital images without suffering a distortion in color, the results cannot be properly reproduced herein in the gray scale printing medium.

FIG. 2 is a brief coding example in Visual Basic for reading a digital screen image, extracting color dots, finding a dot maximum, applying a correction factor for the dot maximum, applying the correction to the entire RGB values for a dot and writing the corrected color dot back to the screen;

FIG. 7a is a brief coding example in Visual Basic for using a GUI interface to select an x1,y1 and x2,y2 window area, reading the digital screen image in the window, extracting color dots, finding a dot maximum, applying a correction factor for the dot maximum, and building a histogram of dot maximum occurrences;

FIG. 7b is a brief coding example in Visual Basic for generating the histogram according to the third embodiment.

FIGS. 10a–10f are photographs of Stone Henge which are respectively, the original, brightened under the prior art, brightened and contrast adjusted under the prior art, brightened and saturation adjusted under the prior art, enhanced according to the first embodiment of the present invention to the full dynamic range and enhanced according to the second embodiment of the present invention;

DETAILED DESCRIPTION OF THE PREFERRED EMBODIMENT

Virtual True Color Light Amplification

Figure 1:
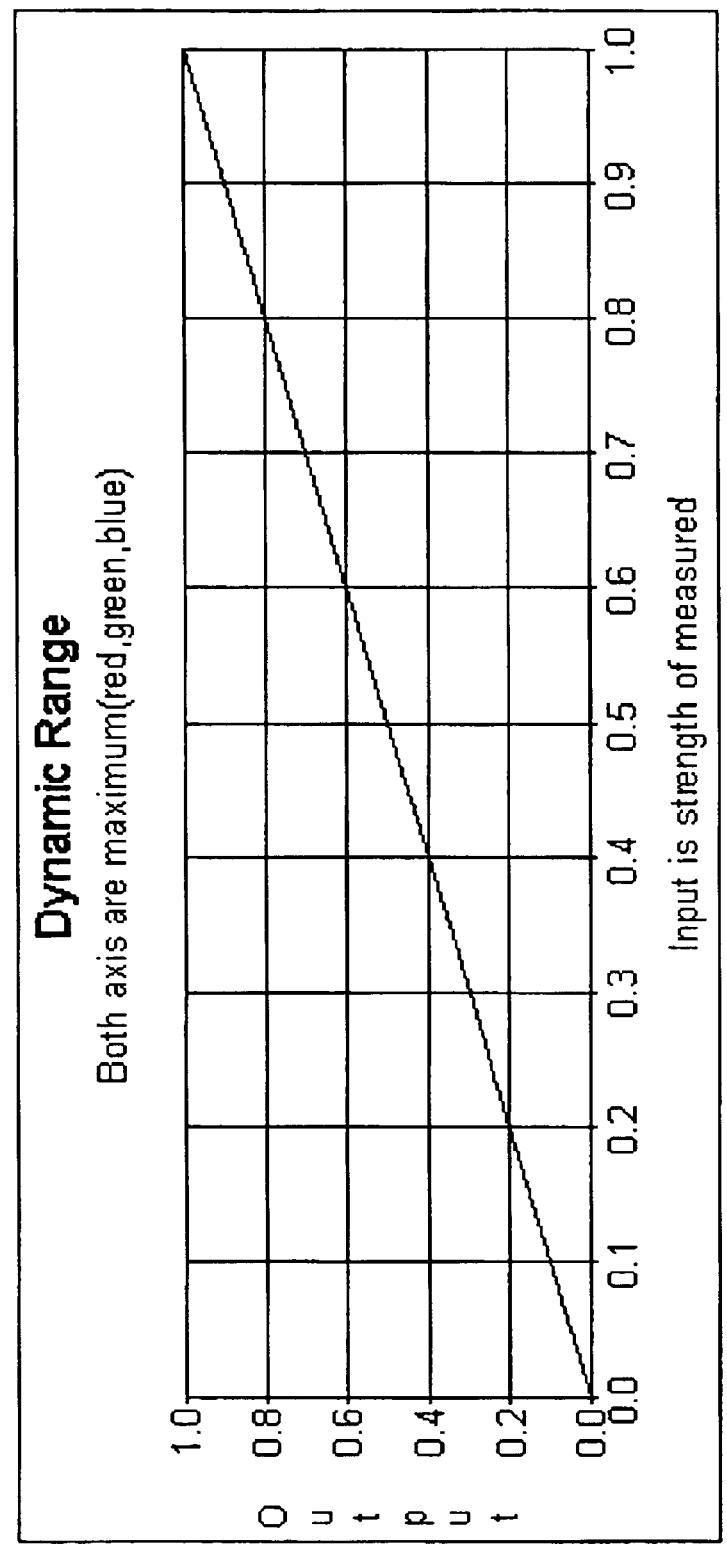
FIG. 1 is a graph representing a linear function as the basis for correcting each R,G or B dot maximum as input to an adjusted output dot maximum, both of which are constrained to the system's dynamic range. This particular function would be a unity function, and would not perform any correction unless the input is normalized to the dynamic range by pre-scaling the maximum of the dot maximums to 1.0.

The present invention disclosed herein implements a new method for automating techniques for amplifying the brightness of color digital images, the basics for brightening images being are set forth in co-pending application Ser. No. 09/548,755 to the applicant, the entirety of which is incorporated herein by reference. A substantial portion of the co-pending application is reproduced herein.

First, an image is captured using some form of digital image recorder. Digital image recorders fall into two categories: physical and virtual. Physical digital image recorders are devices that record a digital image by the measurement of light energy; such as a digital cameras. Like a traditional film camera, digital cameras have a 'lens complex' that provides light gathering and the image is recorded by an array of digital sensors so that the value of each dot represent actual measurements of the light. A digital image can also be obtained as a digital scan of a traditional photograph. In a photograph, light gathering was provided by a traditional camera and the image was recorded on film. Accordingly, a physical digital image recorder can be a combination of camera that produced the film/print image and a scanner that digitized it. Other examples include digital movies, digitized movies, digital x-rays, and the like.

Virtual digital image recorders are computer renderings that imitate reality. The programs create a 'virtual image' (as in virtual reality) by a logical imitation of the photographic process completely internal to the computer itself. These digital images are what a photograph would have looked like had a 'computer model' actually existed. An example is those movies with stunning dinosaur simulations.

A lens complex is the apparatus that gathers light in various forms of photography. There is at least one lens and usually a system of such lenses. The lens complex also includes an aperture stop and a shutter which are both controls on the light gathering.

The light gathering power of a lens is often measured in terms of the surface area of the objective lens itself. A lens with twice the area of another can gather twice the light. In practice, a lens complex has two controls on the amount of light actually gathered. The first control is the adjustable aperture which varies the amount of light that is collected per unit time. Twice the area means twice the light per unit time. The second control is called the shutter and it varies the amount of time that light enters the body of the camera. Holding the shutter open twice as long means that twice the light energy enters the camera.

A true color digital image comprises a grid of dots wherein each dot has three independent measured values representing the strengths of the red, green and blue (RGB) components of the light. This is known as RGB color space. There are various computer file formats used for these images, using various 'compression schemes' to save computer disk storage space. Regardless of compression scheme, all such digital file formats store a grid of dots with RGB values.

Currently, the common standard maximum value stored by such files or a system, for each of the R,G, or B value, is 255. Accordingly, each of the RGB components can range in strength from 0 to 255. Some file formats now store values in the range of 0 to 1023, and higher formats are likely.

Dynamic Range

Every device, including our digital image recorder, has a 'dynamic range' which is a measure of its ability to record relative energy fluctuations. As stated above, this dynamic range is usually set by the storage means, file or system and is typically 0–255. In photography, the trick to success is to use all the dynamic range without exceeding it. In a photo, the trick is to capture both the details in bright areas and details in dark areas without a loss of details anywhere.

In film photography, when a significant area of the negative has turned completely opaque it means that the light was so intense in that area that no film crystals were left unchanged. The variations within the washed out area of the photograph are lost and can be said to 'have exceeded the dynamic range of the system'.

In digital photography, the strength of the light energy is measured by the photo-electric sensors. These values are stored as a true color format computer file. The dynamic range of the system is exceeded when areas of the grid have been set to the maximum (say 255). Accordingly, variations within the bright areas, hypothetically 256–300 can only be recorded as 255 and thus details within such areas are lost.

With a limited dynamic range, as is the case with digital images, the amount of light which is captured can significantly affect the image. Consider if one image is obtained containing one particular dot of light which is measured within the dynamic range of the recording device. For example, the light may come from a brown surface. The light dot is measured in terms of three color strengths, the red (R), green (G) and blue (B). If a second image is obtained having had double the exposure time, then twice as much light will go into the recording device for each and every dot, including the dot we are considering. If the range of light remains within the dynamic range of the system, then all the three values of R, G, and B will be doubled—yet the color of the original brown dot remains as brown. Doubling of the incoming light means its strength measurement will be doubled—R is doubled, G is doubled and B is doubled.

In the case of digital information, for example, upon a doubling of the light (through a larger aperture or longer exposure), relative RGB values are also doubled. RGB values of 50,30,20 are doubled to 100, 60,40, because 100=50*2, 60=30*2, and 40=20*2.

When twice as much energy hits each sensor, then each sensor has twice the stimulation. Twice as much red energy hits the red sensor and the other energy doesn't matter to it. Twice as much green energy hits the green sensor. And twice as much blue energy hits the blue sensor.

As the light gathering power increases, the three measurements of the primary colors of the same dot increase proportionally as shown in the following Table 1—hence the color remains the same, only brighter.

TABLE 1

Effect of Increasing Light Gathering Power on Measurements of RGB

| Light Gathering Power | Description | Red | Green | Blue | Green/Red | Blue/Red |
|---|---|---|---|---|---|---|
| 1 | "Reference, one unit" | 50 | 30 | 20 | 0.600 | 0.400 |
| 1.1 | Up 10% | 55 | 33 | 22 | 0.600 | 0.400 |
| 1.2 | Up 20% | 60 | 36 | 24 | 0.600 | 0.400 |
| 1.3 | Up 30% | 65 | 39 | 26 | 0.600 | 0.400 |
| 1.4 | Up 40% | 70 | 42 | 28 | 0.600 | 0.400 |
| 1.5 | Up 50% | 75 | 45 | 30 | 0.600 | 0.400 |
| 2 | Double | 100 | 60 | 40 | 0.600 | 0.400 |
| 2.5 | Two and a half times | 125 | 75 | 50 | 0.600 | 0.400 |
| 3 | Triple | 150 | 90 | 60 | 0.600 | 0.400 |
| 4 | Four times | 200 | 120 | 80 | 0.600 | 0.400 |
| 5 | Five times | 250 | 150 | 100 | 0.600 | 0.400 |

In Table 1, note that the ratio of Green/Red and the ratio of Blue/Red remain constant, regardless of the light gathering power.

The reference level for light gathering power is artificial, a matter of convenience. What is the 'correct' measurement of the color of the dot of Table 1? An image collected from an overcast outdoors environment may measure the color dot at 50,30,20 and the color dot measured in a bright indoor setting could be 200,120,80 utilizing four times the light gathering power.

While it is possible to calibrate light gathering power in terms of the energy that is collected, it is rarely done in practice. The light gathering power of our own eyes naturally varies. City lights that seem so very bright at night appear dull in daylight because the eye's iris automatically opens at night and then closes during the day, as is required to deal with the natural extreme variations in light level. Applicant is not aware of a recording device that has a wide enough dynamic range to handle the range from natural daylight to artificial city night lighting with the same light gathering settings. What makes a good image is, in part, that the light gathering ability is varied with the light—so that the recording is not pushed outside of the dynamic range. Both measurements of 50,30,20 and 200,120,80 for the same color or dot are valid.

For any set of three numbers, such as the intensity values for each of Red, Green, and Blue, there are a total of six possible ratios and they are G/R, B/R, G/B, R/G, R/B, and B/G. Only two of the ratios are unique, the other four ratios are redundant as they are variations of the first two.

For example, based upon G/R and B/R, the others are:
green/blue=(green/red)/(blue/red)
red/green=1/(green/red)
red/blue=1/(blue/red)
blue/green=(blue/red)/(green/red)

In principle, any two of the six can be chosen. For the purposes of this description, the ratios of green/red and blue/red are chosen.

An efficient choice for the value of the strength of the RGB triplet would be to simply take the maximum value from amongst the three RGB values. In the case of 50,30,20 for RGB respectively, red happens to be the maximum value and the calculation of strength and the two ratios becomes:
Strength=red=50
Ratio1=green/red=30/50=0.600
Ratio2=blue/red=20/50=0.400

In reverse, one can back-calculate and recover the red, green and blue values as follows:
red=Strength=50
green=Strength*Ratio1=red*green/red=50*0.600=30
blue=Strength*Ratio2=red*blue/red=50*0.400=20

This artificial representation of the RGB triplet is useful because, for any dot, the two ratios are independent of the light gathering power. The amount of light gathered only affects the strength component.

Too much light gathering will cause the measurement of the color to become distorted because at least one of the three primary colors RGB will exceed the dynamic range and thus will not be accurately represented. Consider the previous example dot of 50, 30, 20 at some arbitrary reference level of light gathering power. If the image is re-recorded, but at a much higher light gathering power, then at least one color will be pushed beyond the dynamic range.

TABLE 2

Increasing Light Gathering Power beyond the Dynamic Range of System

| Light Gathering Power | Description | Red | Green | Blue | Green/Red | Blue/Red |
|---|---|---|---|---|---|---|
| 1 | Reference | 50 | 30 | 20 | 0.600 | 0.400 |
| 3 | Triple | 150 | 90 | 60 | 0.600 | 0.400 |
| 5 | Five times | 250 | 150 | 100 | 0.600 | 0.400 |
| 5.1 | 5.1 times | 255 | 153 | 102 | 0.600 | 0.400 |
| 5.2 | 5.2 times | 255 | 156 | 104 | 0.612 | 0.408 |
| 6 | Six times | 255 | 180 | 120 | 0.706 | 0.471 |
| 7 | Seven times | 255 | 210 | 140 | 0.824 | 0.549 |
| 8 | Eight times | 255 | 240 | 160 | 0.941 | 0.627 |
| 9 | Nine times | 255 | 255 | 180 | 1.000 | 0.706 |
| 10 | Ten times | 255 | 255 | 200 | 1.000 | 0.784 |
| 11 | Eleven times | 255 | 255 | 220 | 1.000 | 0.863 |
| 12 | Twelve times | 255 | 255 | 240 | 1.000 | 0.941 |
| 13 | Thirteen times | 255 | 255 | 255 | 1.000 | 1.000 |
| 1 | "Reference, one unit" | 50 | 30 | 20 | 0.600 | 0.400 |

Notice that neither the ratio of green/red nor blue/red are constant (because they have saturated) past 5.1 times the light gathering power. Because there is a maximum amount of energy that can be measured by the recording device (either digital sensors or film) there is a practical limit to the useful light gathering power for any subject. In Table 2, when light gathering power exceeds five times the reference power, the dynamic range is almost fully used. The strength of the dot is 250 and the maximum that can be stored is 255. That maximum is reached, exactly, at 5.1 times the light gathering power. At 5.1 the strength of the dot is 255 yet the two ratios are still 0.600 and 0.400 respectively. At 5.2 times the light gathering power, even more light enters the recording device. The red sensor would have stored the number 260 but it cannot because the dynamic range is surpassed and the value is clipped to 255 instead. The correct numbers are stored for both the green and blue sensors, however, the incorrect total color is recorded and this is revealed by noticing that the two ratios now vary from the proper ratios of 0.600 and 0.400. At 6 times the light gathering power, even more light enters and the distortions are correspondingly greater. The ratios are now significantly different and incorrect at 0.706 and 0.471 and these correspond to a significantly different color. At 8.5 times the light gathering power, the blue sensor also measures clipped values. The light is recorded as having the same strength in both the red and blue primary colors. The blue to red ratio is now 1.000 and the previous distorted color (reddish brown) now further distorts to an orange. Finally, at 12.25 times the light gathering power, all three sensors clip and the color is recorded as three full strength primary colors, meaning white.

It is important to avoid collecting light beyond the ability of the recording system (it's dynamic range) because it causes distortion in the color.

Any one of the RGB triplet can be chosen as the reference color. If green was the strongest color, and assuming the color was 30,50,20 (having the same reference light gathering power as the previous red example), then having reference to Table 3, the same behavior is exhibited.

TABLE 3

Effect of Increasing Light Gathering Power with Green as strongest color

| Light Gathering Power | Description | Red | Green | Blue | Green/Red | Blue/Red |
|---|---|---|---|---|---|---|
| 1 | Reference | 30 | 50 | 20 | 1.667 | 0.667 |
| 3 | Triple | 90 | 150 | 60 | 1.667 | 0.667 |
| 5 | Five times | 150 | 250 | 100 | 1.667 | 0.667 |
| 5.1 | 5.1 times | 153 | 255 | 102 | 1.667 | 0.667 |
| 5.2 | 5.2 times | 156 | 255 | 104 | 1.635 | 0.667 |
| 6 | Six times | 180 | 255 | 120 | 1.417 | 0.667 |
| 7 | Seven times | 210 | 255 | 140 | 1.214 | 0.667 |
| 8 | Eight times | 240 | 255 | 160 | 1.063 | 0.667 |
| 9 | Nine times | 255 | 255 | 180 | 1.000 | 0.706 |
| 10 | Ten times | 255 | 255 | 200 | 1.000 | 0.784 |
| 11 | Eleven times | 255 | 255 | 220 | 1.000 | 0.863 |
| 12 | Twelve times | 255 | 255 | 240 | 1.000 | 0.941 |
| 13 | Thirteen times | 255 | 255 | 255 | 1.000 | 1.000 |

As shown, the same situation occurs wherein the green/red and blue/red ratios become distorted in a very similar manner. In this case, the ratios red/green and blue/green produce the same numbers (0.600 and 0.400) as in the previous 50,30,20 illustration for the case of red.

Accordingly, regardless of which of the RGB triplet is the maximum, there is a symmetry and strength is defined as the maximum strength value of (Red, Green, and Blue) and color ratios result (red/Strength, green/Strength, blue/Strength). One of the three ratios will be exactly equal to 1 because strength is always equal to one of the numerators. In the case of Red from Table 1, RGB=50,30,20 so that strength=max of (50,30,20) which is 50 and the color ratios are (50/50, 30/50, 20/50)=(1, 0.600, 0.400).

Thus, for Red, Green and Blue respectively:

| Color      | Strength | R/S | G/S | B/S |
|------------|----------|-----|-----|-----|
| 50, 30, 20 | Red      | 1   | 0.6 | 0.4 |
| 30, 50, 20 | Green    | 0.6 | 1   | 0.4 |
| 30, 20, 50 | Blue     | 0.6 | 0.4 | 1   |

As considered before, when a camera gathers more light compared to another setting for the same image, a given dot has the qualities that the ratios of the measured primary colors remain the same—if we are within the dynamic range of the recording system. Instead of thinking of the dot as an RGB triplet we can think of the dot as a strength and ratios. Again, for our dot, 50,30,20 at its reference strength of 50, the color ratios are 1, 0.600 and 0.400.

Enhancing the Image

As long as the color ratios are unaltered, the image can be adjusted without adversely affecting the colors. For instance, should insufficient light have been gathered by the recording device, we can virtually amplify the light power or strength while maintaining the color.

To virtually amplify or scale the light by a correction factor of 2, the strength is doubled without varying the color ratios: For example, doubling the strength of our dot of (50,30,20) to 100 results in a color dot of 50*2*(1,0.6,0.4)= (100,60,40). Simply, the same result can be achieved by simply multiplying the R,G, and B by 2.

This virtual true color light amplification is accomplished by multiplying or scaling all three primary colors by the same number. No colors become distorted, as long as the output values stay within the dynamic range. The dynamic range is exceeded if a R, G, or B value is calculated that is greater than the range used by the file format for the image (such as 255).

One can ensure that no value, resulting from the triple multiplication scaling, can exceed the dynamic range, by deriving the correction from an algebraic scaling expression or function.

Having reference to FIG. 1, the X-axis represents the strength of an image dot (Maximum of red, green, and blue). The scales of 0–1 represent the limits of the dynamic range (such as 0–255). For the linear diagonal shown, a strength of 50 (50/256=0.2) for a dot is scaled by unity for an output value of 0.2. Accordingly, the unity diagonal corresponds to a 'no operation' situation where the output is identical to the input. However, once the scaling function deviates from unity, the output values will be different from the input values, resulting in a change to the image.

To scale the dynamic range from 0 to 1.0 is to simply divide a current strength (maximum of the RGB triplet) value by the maximum number that can be stored with this dynamic range. Suppose that number is 255. An arbitrary dot will have a dot maximum strength having a number between 0 and 255. To scale the dot maximum to 0 and 1.0 one divides the strength by 255.

Both the input and the output axis represent the values of the maximum of the RGB triplet; the dot maximum. The input is the dot maximum under consideration. The output corresponds to the adjusted dot maximum for the RGB triplet that will be calculated as a result of the method.

Dot Maximum

One method to find the maximum of an input RGB triplet is to choose one as maximum, testing each of the others, and resetting the maximum to that other if higher.

The following 3 lines of pseudo code illustrated the selection of a dot maximum:

```
strength = red
    strength is set to red value
IF strength < green THEN strength = green
    if strength is less than green value then reset it to the green value
IF strength < blue THEN strength = blue
    if strength is less than blue value then reset it to the blue value
```

Having reference to FIG. 1, any scaling or correction is constrained to the 1×1 graph shown. The input axis is constrained to the domain from 0 to 1 and the output axis is constrained to the range of 0 to 1. This means that the strength of an adjusted or corrected dot will not exceed the dynamic range.

Any scaling function that can be plotted within the constrained graph can be used for virtual true color light amplification. The properties of a particular graph will affect the final aesthetics and application. A particular function is chosen as appropriate for the application; whether it be to adjust the brightness of an entire image, or a portion of the image, or other adjustment.

Two implementations of the scaling function correction include forming a lookup table of corrections (a finite number dictated by the dynamic range); and another less efficient means is to calculate each dot independently in turn. One can understand that in an image, the value of the strength of a particular dot may be repeated many times for many other dots. Thus, for efficient calculation, in the case of a look-up table, a correction can be calculated only once but applied many times.

For the look-up table approach, once the parameters needed to specify a particular scaling function are known—all the corrections (usually 256 of them, this depends on the limit of the dynamic range) are then calculated by means of a subroutine and the results stored in a look up table so that each is only calculated once. The correction is then simply looked up in this way (a pseudo coded example is:)

```
corr = corra(strength)
    where corr is the particular correction for the current dot;
        corra( ) is the lookup table or array that stores the corrections;
        and strength is the dot maximum of the RGB for the current dot.
```

The other (less efficient) way is to have a function calculate the correction for a particular dot, each one in turn. An example would be

```
corr = correct(strength)
    where corr is the particular correction for the current dot;
        correct ( ) is the correction function which executed by
            simply 'calling' its name in this way; and
        strength is the dot maximum of the RGB for the current dot.
```

A given point along the graphed scaling function, which provides an input and output value, is to be used to derive the correction multiplier or factor. A correction factor is equal to output value/input value.

So as to maintain the respective color ratios, all three of the RGB triplet values are multiplied by this same correction corr as determined for and specified by the dot maximum.

Accordingly, red=red*corr; green=green*corr; blue=blue*corr where red, green, blue end up holding the values for the current dot before and after correction. The effect of coupling these four considerations is that of Virtual True Color Light Amplification. The Dynamic Range is never exceeded and the color is always preserved.

Practical Implementation

An image can be read in various ways. Applicant has avoided the need to review the various graphical computer file formats by illustrating the method on a displayed image. Applicant is aware that, currently, Visual Basic (a programming language operable under the Windows operating system—all trademarks of Microsoft Corporation) and most other modern programming languages have simple commands that allow for image reads. In Visual Basic, one command is pbox.Picture=LoadPicture(file_in) where pbox is a 'picture box object', used for displaying pictures, Picture is a 'method' which assigns a picture to the object, LoadPicture( ) is the function that reads Picture Files, and file_in is the name of the file that is to be read. Once this command is issued by Visual Basic, the image file is read in and displayed on the screen in the programming 'tool' called the 'picture box object'. There is a similar method to save a picture.

Having reference to FIG. 2, the simplified code illustrates a Visual Basic implementation of the virtual true color light amplification method applied to an image. This simplified technique requires, at a minimum, a 16 bit video card and a 24 bit card is preferable. The code of FIG. 2 is directed to extracting color values from the video card itself. This is not the most efficient technique and could be improved significantly by storing the image in the main RAM memory. This would eliminate accessing the video card at all and eliminate the extraction steps of stripping R, G and B values from a combined color variable such as that returned by Visual Basic function pbox.Point(icol,irow). Accessing memory could result in about a 7 times efficiency gain.

Simply, the process permits a rectangular displayed image of dots to be adjusted. For example, the image may be dark, only having a maximum strength for any of the dot maximums being about 128, or half the dynamic range for the system. In the simplest case, the image range is scaled to the dynamic range as a linear function. Accordingly, by normalizing the maximum of 128 to 255, the strength of all dot maximums will be doubled. Accordingly, the scaling function is merely a constant of 2 and the look up result, for any dot maximum, is 2. For each column of the image, the values of the color are extracted for blue, green and red. The dot maximum is set as red and the green and blue are tested to reset the strength to the maximum amongst the three. The correction is looked up in the table, in this case being a constant of 2. Each of the values for RGB are scaled by 2, the maximum scaled value being 128*2 or 256—the maximum of the dynamic range. The modified dot is written back to the display, all colors having been preserved and without having exceeding the dynamic range.

Applications—Effect of the Scaling Function

The virtually infinite selection of scaling functions, as applied to the image, results in different effects to suit various differing objectives. Sometimes the quality of the image dictates which function is used (such as a function designed simply for brightening a dark image), or a more particular function which enhances only specified strengths within an image (such as extracting detail from a narrow portion with minimal concern regarding the effect on the other portions of the image).

Applications—Virtual Lens

Both the aperture and the shutter cause problems in and of themselves. If the subject of the photograph is moving, the shutter can only be open for a short period of time or the image will be blurred by the motion itself.

When the aperture is opened up, the depth of field (which means the range of distance that is in focus) decreases. Even when focusing correctly, a wide open aperture means that only a small range of distance will be in focus. This 'distortion' is due to the spherical shape of the lens itself. When the aperture is small, the depth of field is better because only the nearly flat center of the lens was used. The smallest aperture setting provides the largest depth of field.

In practice, photography (and light gathering in general) is a trade off of these two effects. A motionless scene can have a large depth of field, by choosing a small aperture and a slow shutter speed. A racing car can only be photographed at the cost of the depth of field, the shutter cannot be open for long and so the aperture must be opened to gather more light.

Suppose that a 'normal' quality lens is used to photograph something that is moving quickly but the photographer does not want to lose the depth of field. Without the process of the present invention there is no way to do this. Accordingly, by setting the controls to gather too little light, in terms of normal photographic thinking, the uncorrected image will be too dark but the depth of field is preserved. Suppose the photographer had collected a quarter (25%) of the amount of light that would make full use of the dynamic range. The image will be nearly black, with the highest value recorded being 63 whereas the dynamic range limit is 255. This image can be corrected to bring out the detail in the dark areas.

Figure 3:
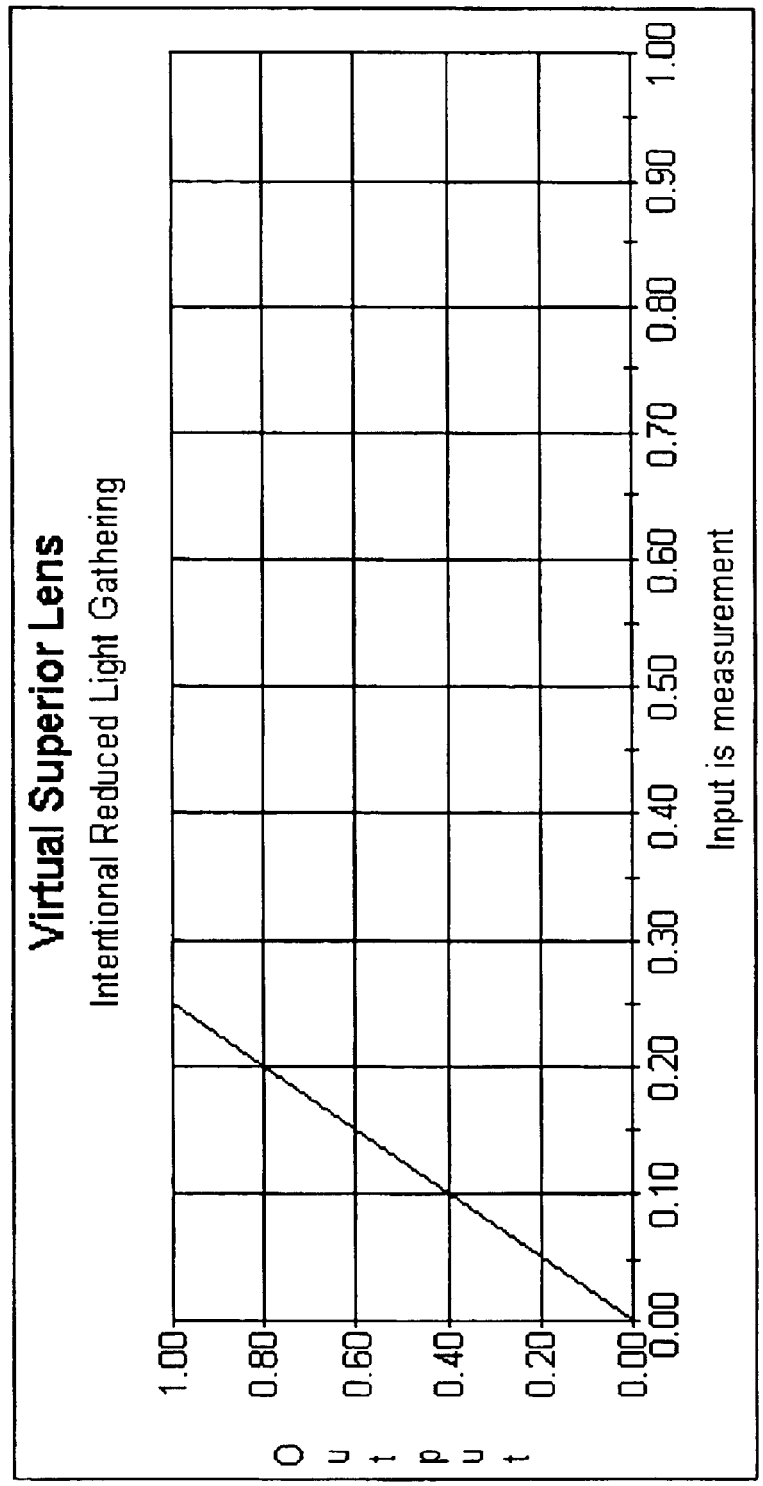
FIG. 3 is a graph illustrating a scaling function designed to modify an image which was intentionally underexposed, such as by using a small aperture so as to obtain improved depth of field.

Accordingly, in a first embodiment, and having reference to FIG. 3, the graph is a straight line which terminates at the point (x, 1.0) where x is the maximum of the entire measured image. This maximum value can be found using a modified histogram approach. In this example, x would be 0.25 but it could be any value between 0 and 1. In the preferred embodiment of the invention, virtual light is added in the same way that opening the aperture more would have except that it will have a depth of field associated with a superior lens. This process can also be used to make up for 'blunders' where inappropriate lens settings resulted in a too dark photograph.

Virtual Iris

Figure 8:
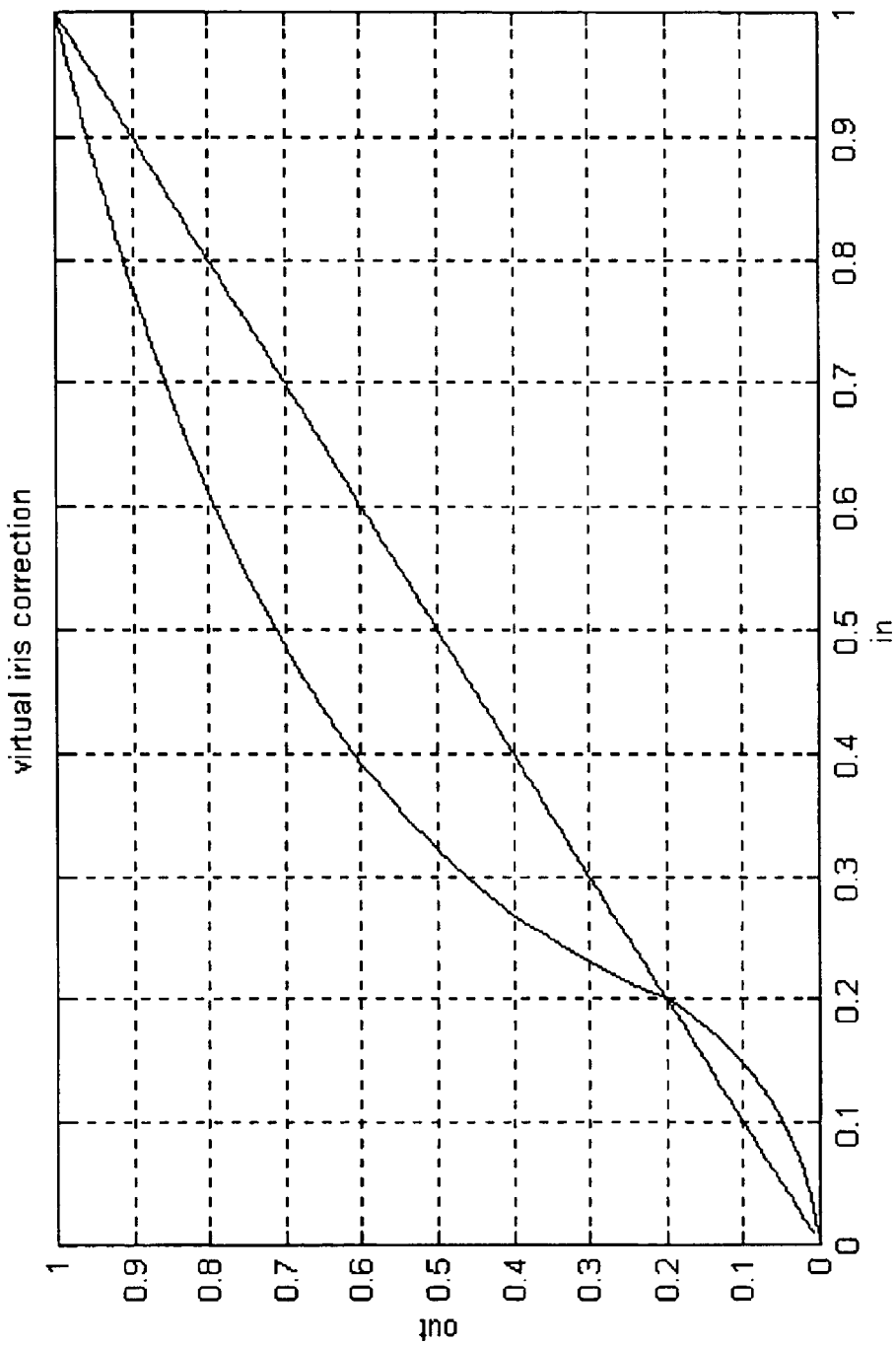
FIG. 8 is a graph illustrating variable scaling functions superimposed over a unity diagonal, the variable functions produce an aesthetically pleasing enhancement through the brightening of the image. The scaling functions are smooth curves, one a factor of the other, such as a third order curve, which de-emphasizes the darker areas and brightens the lighter areas.

In a second embodiment, and having reference to FIG. 8, a graph can be chosen so that the darkest parts of the image will remain dark, the duller parts will brighten but also so that the bright parts of the image remain nearly unaffected. FIG. 8, and similarly shaped smooth non-linear graphs, have the effect of imitating the iris when used with the virtual true color light amplification of the present invention. The output image happens to more closely resemble one's visual memory of the experience. Applicant refers to this enhancement as "virtual iris".

The gentle nature of this non-linear graph ensures that a quality input image will result in an attractive processed image. The important aspects to maintain this aesthetic result is that the graph remains smooth, the slope of the graph is never zero and is also smoothly changing, and that there is a net brightening effect in total.

In FIG. 8, the scaling function approaches the asymptote of the minimum and maximum of the system's dynamic range. The more the function approaches a tangent to the minimum and maximum of the dynamic range, the more severe the correction.

Virtual Detail Enhancement

Simply, any one frame of a photo is the result of only one aperture and shutter setting. In investigative work, this has the annoying limitation that details in certain areas of the photograph will be subtle. In a third embodiment, a process is provided for bringing out detail in that certain subtle area.

Figure 4:
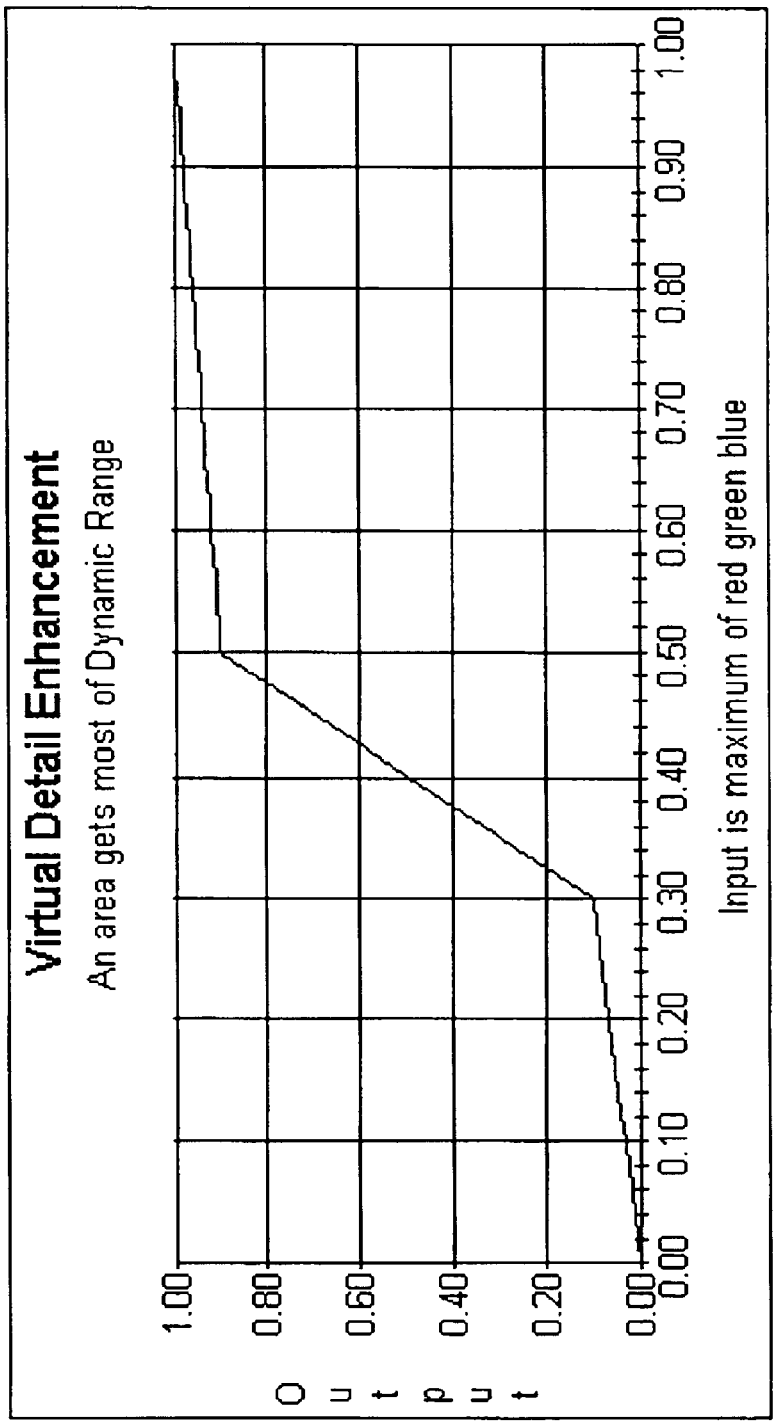
FIG. 4 is a graph illustrating a scaling function which enhances the contrast within a specific area of the dot maximums, falling between 0.3–0.5 of the image's range, by scaling 20% of the range to nearly 100% or substantially the entire dynamic range, and wherein the darker and lighter areas contrasts are diminished.

Having reference to FIG. 4, an area of interest is chosen and a histogram approach is applied to find that the minimum strength dot within the area is 0.30 and the maximum strength dot is 0.50. This area utilizes only 20% of the dynamic range, which means that the contrasts will be subtle—or virtually indistinguishable to the eye.

Applying a three part linear scaling function as shown in FIG. 4 turns these small contrasts into large ones as the output from that specified area now varies over 80% of the dynamic range.

The small sloped lines below 0.30 and above 0.50 on the input have the effect of washing out the detail in darker and brighter parts of the image. But the resulting color, at each dot, will never be corrupted and the brighter parts of the image provide a good reference.

Figure 5:
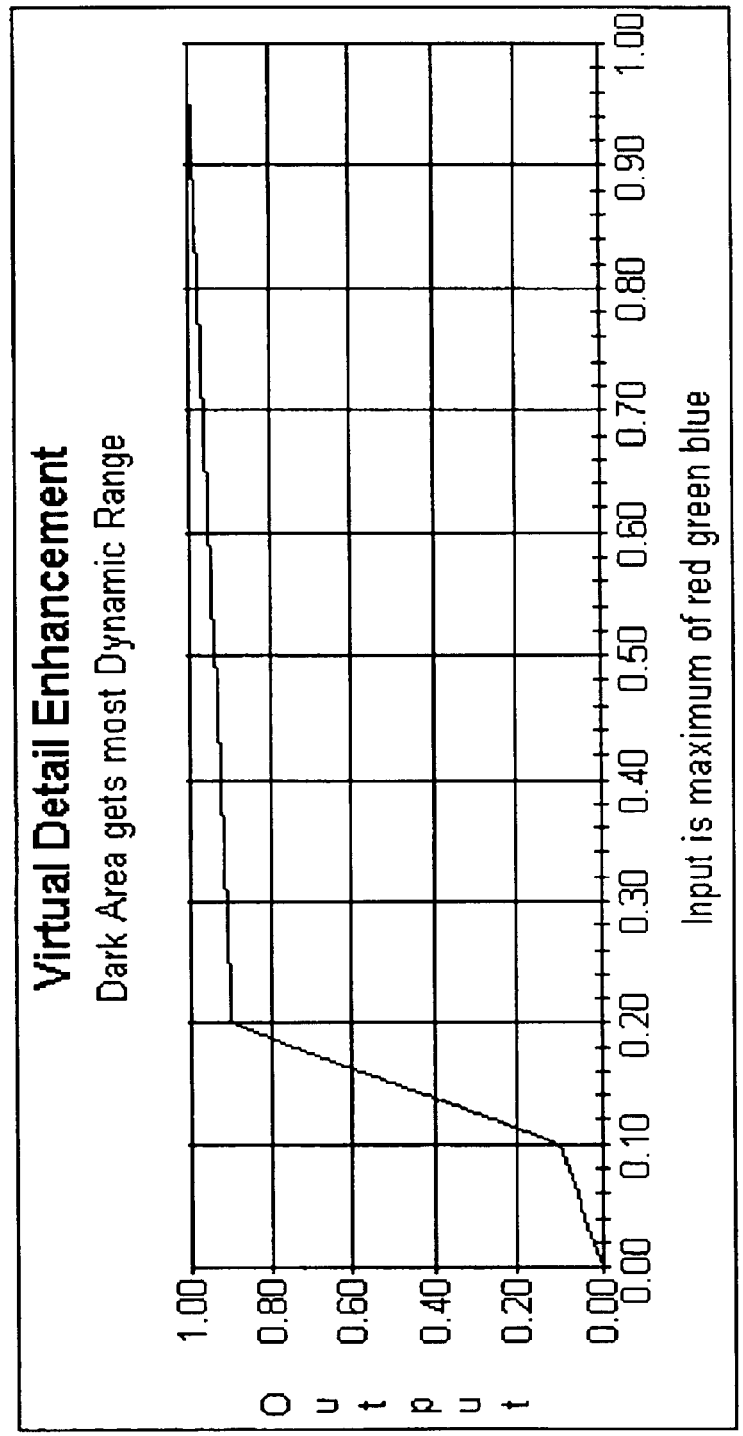
FIG. 5 is a graph according to FIG. 4 which enhances the dot maximums in the dark area falling between 0.1–0.2 of the image's range.
Figure 6:
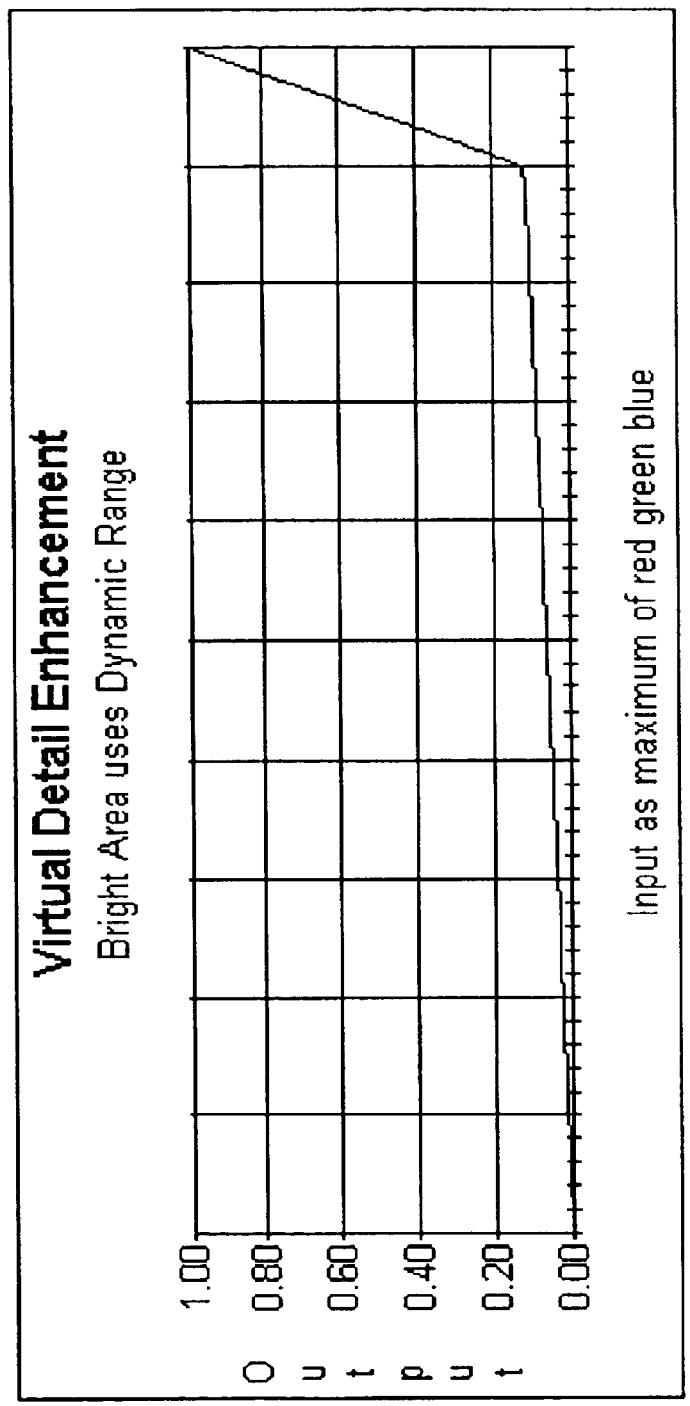
FIG. 6 is a graph according to FIG. 4 which enhances the dot maximums in the bright area falling between 0.9–1.0 of the image's range.

Any area of the photograph can be chosen. Having reference to FIG. 5, details in a very dark area are revealed, such as writing obscured in shadow. FIG. 6 illustrates how to bring out the details in a bright area, such as tracks in the snow. Any number of areas can have their detail enhanced by simply choosing the area of interest and applying the correction.

More particularly, any areas or portions of the image can be optimized. First, the area needs to be identified. In a Graphics User Interface, this is easily done using the mouse in a 'click and drag' operation. This can be done in Object Oriented Programming by using the Operating System (Windows) to identify when the mouse button has been clicked. In Visual Basic there are built in subroutines (for every program) that are executed as soon as the mouse button is depressed or released.

A user can select any rectangular area within the image. The 'coordinates' are stored in common memory as xdwn, ydwn, xup and yup. See the photographic examples #1 and #2 for the superimposed rectangle on the image.

In both the Virtual Lens and the Virtual Detail Enhancement, I referred to a 'modified histogram approach'. A histogram is simply the measurement of the number of occurrences against the value of the occurrences.

For example, as shown in Table 4, in terms of a set of RGB triplets:

TABLE 4

Standard Histogram Approach
"Red, Green, and Blue values taken as independent"

| Dot # | Red | Green | Blue | Value | # Events |
|-------|-----|-------|------|-------|----------|
| 1 | 1 | 1 | 1 | | |
| 2 | 0 | 0 | 1 | 0 | 2 |
| 3 | 2 | 2 | 1 | 1 | 11 |
| 4 | 4 | 3 | 1 | 2 | 3 |
| 5 | 4 | 4 | 4 | 3 | 7 |
| 6 | 3 | 2 | 1 | 4 | 5 |
| 7 | 5 | 1 | 1 | 5 | 2 |
| 8 | 3 | 3 | 1 | | |
| 9 | 4 | 3 | 1 | Total | 30 |
| 10 | 3 | 3 | 5 | | |

In this example, there are 10 dots each having 3 values (red, green and blue) and each of these 30 values range in value from 0 to 5. The normal histogram is calculated by adding up the number of times each value (0, 1, 2, 3, 4, and 5) occurs in total.

The modified histogram approach, where strength=max (red, green, blue), described by Table 5 as follows:

TABLE 5

Modified Histogram Approach
"Red, Green, and Blue values taken as a unit, Histogram on maximum"

| Dot # | Red | Green | Blue | Strength | Value | # Events |
|-------|-----|-------|------|----------|-------|----------|
| 1 | 1 | 1 | 1 | 1 | | |
| 2 | 0 | 0 | 1 | 1 | 0 | 0 |
| 3 | 2 | 2 | 1 | 2 | 1 | 2 |
| 4 | 4 | 3 | 1 | 4 | 2 | 1 |
| 5 | 4 | 4 | 4 | 4 | 3 | 2 |
| 6 | 3 | 2 | 1 | 3 | 4 | 3 |
| 7 | 5 | 1 | 1 | 5 | 5 | 2 |
| 8 | 3 | 3 | 1 | 3 | | |
| 9 | 4 | 3 | 1 | 4 | Total | 10 |
| 10 | 3 | 3 | 5 | 5 | | |

Simply, it is the occurrence of numbers as found in the maximum strength that is used to build the histogram and not the values of red, green and blue separately.

This is in keeping with the nature of this patent application which is that red, green, and blue values are to be treated as a unit having a strength and ratios and not as three independent values.

The histogram is built by considering only those dots within the range of rows=xdwn to xup and columns=ydwn to yup.

Having reference to FIG. 7a, example code is provided by which to apply the modified histogram.

At this point, the histogram is formed and its running total is known with respect to the strength of the RGB triplets of the marked area. The beginning and the ending significant strengths are determined, as reflected by the histogram data.

To avoid errors such as dead or saturated recording elements and otherwise 'stray values' that are not representative of the area, one can limit the relevant dots to the 2% and the 98% of the number of occurrences to represent the smallest and largest relevant RGB strengths.

The number of strengths counted by the histogram, in total, is equal to the last running total value, and the 2% and 98% values are, therefore, easily found. Code is shown in FIG. 7b which determines the range of strength index (hmin and hmax) corresponding to the range of strengths within the box selected by the user.

Having reference also to FIG. 4, the modified histogram approach found 0.30 (of the dynamic range maximum) and 0.50 (of the dynamic range maximum) to be the minimum and maximum strength values of the portion of the image selected by the user. (See photographic examples #1, #2, for the boxes).

It was also assumed that the range calculated from the modified histogram approach should be modified so that it varied over the majority of the dynamic range.

So, what should this input range of hmin and hmax be turned into? We want it to occupy most of the dynamic range. A good guess is 80% of the dynamic range with a little left over for the darker and lighter areas so they can still be used as a reference.

In application code, the output strength range of the selected area was originally set to 0.1 to 0.9 of the dynamic range maximum. It was later reset to 0.2 to 0.9 as these numbers simply seemed better after observing many images.

The code used to calculate the look up table based on the modified histogram approach for determining the input strength range and the (nearly) arbitrary output range of 0.2 to 0.9 follows.

The graph of FIG. 4 can be thought of, in the general sense, as having 3 line segments each with two end points.

TABLE 6

| | Line Segments: | |
|---|---|---|
| Line Segment | Start | Stop |
| #1 | (0, 0) | (xmin, 0.20) |
| #2 | (xmin, 0.20) | (xmax, 0.90) |
| #3 | (xmax, 0.90) | (1.0, 1.0) | where xmin and xmax have been calculated by the modified histogram approach. That is to say:

$$xmin = hmin/drmx$$

$$xmax = hmax/drmx$$

Both input axes are measured in terms of the dynamic range. The input values are in terms of the strength (max of RGB) of the dot. The graph never leaves the 0 to 1 'box'. These constraints must always be met by any scaling function in any specific process.

All that remains, here, is that the output value be calculated by a program equivalent to that described for FIG. 2 above and that the lookup table does not hold the graph, exactly, but the ratio of the output to the input.

Each line segment can be expressed with algebra in the 'slope intercept' form, of which the general form is: y=m*x+b. For each of the three line segments, linear equations and scaling factors are determined. An array of corrections or scaling factors can be formed from the three equations. Dividing the output values by the system dynamic range produces the ratio of output to input.

This virtual detail enhancement technique, or forensic flash due to its ability to delve into the normally obscured areas, maximizes the dynamic range of any target so that the details are enhanced. This is not restricted to the target area but any part of the photograph that has similar strengths to the user's choice will also be so enhanced. Any target area can be selected and so there can be many valuable corrections performed on the same photograph. Those areas which were stronger than the strength range picked by the user remain as useful references due to the 'true color' nature of the correction.

EXAMPLES

Virtual Flash—Virtual Iris

The examples illustrated in FIGS. 9 and 10 illustrate corrections to the limitations that occur from the physical light gathering devices or image recorders. The one aperture and shutter setting per frame means that a photograph is likely to vary from one's memory of the experience of being there. The eye's iris adjusts itself when experiencing contrasts. In a park on a sunny day, the iris opens up when moving from sunlight to the shade so that you remember all the grass as being green whereas photos often show shaded grass as black.

Photo #1 (FIGS. 9a–9f) Tourist Photo of an Abbey

Figures 9A, 9B, 9C, 9D, 9E, 9F:
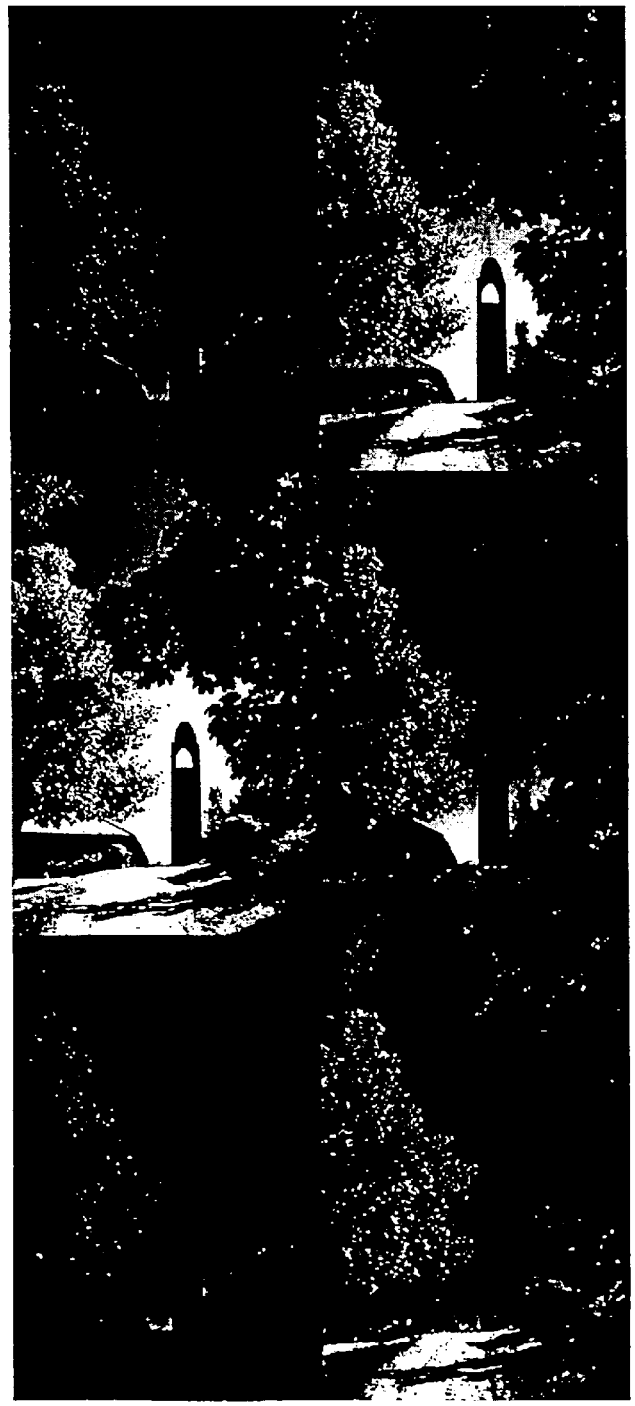
FIGS. 9a–9f are photographs of an Abbey which are respectively, the original, brightened under the prior art, brightened and contrast adjusted under the prior art, brightened and saturation adjusted under the prior art, enhanced according to the first embodiment of the present invention to the full dynamic range and enhanced according to the second embodiment of the present invention.

This example illustrates how various prior art processes and the present invention enhance the image. The approach with the prior art processes is to "play" with the image until the brightness looks about right for what you want. It is a subjective thing and the expert user is someone who is good at making the necessary compromises. In FIG. 9a, the original image, scanned from a photograph, is very dark but still uses all/most of dynamic range (of the dot maximums (hits) being outside the strengths of 5 and 254) of a system of 256.

FIGS. 9b–9d illustrate prior art image brightening techniques. FIG. 9b does so by increasing the image brightness by 80%. While the image of FIG. 9b is brighter, the colors are badly faded and the sky has also experienced change in color. FIG. 9c illustrates the prior art brightened image of FIG. 9b with contrast set to 50%. Contrast is increased in an attempt to try to restore the colors lost in brightening. Notice how much of the detail of the image is lost. The process has pushed many of the dots past the edge—outside of the dynamic range. FIG. 9d illustrates the brightened image of FIG. 9b with the saturation set to 50%. Increase in saturation is another technique for restoring the colors. As a result, the sky is almost returned to what it was but the rest of the image has significant and unsightly color distortions.

Applying the techniques of the present invention, the photo fairs much better particularly in FIG. 9f. In FIG. 9e, the image range of 5 to 254 is linearly mapped to 0 to 255. The effect is small because the original image was nearly full range already. It does, however, ensure that we have the full dynamic range in the output image. In FIG. 9f, the scaling function of FIG. 8 was applied for obtaining a superior image. All the colors are true to the image, as it was scanned, and are vibrant, just as they would have been to the eye with no loss of detail.

Photo #2 (FIGS. 10a–10f) Tourist Photo of Stone Henge

In the original frame of FIG. 10a, the stones are in the shadows due to the extreme lighting conditions. In FIG. 10f, the virtual iris process of the present invention compensates in a similar way that the iris does automatically, turning the poor photo into a good one.

More particularly, in FIG. 10a, the subject is very dark and again uses all/most of dynamic range (only 1% of the hits being outside of a strength of 6 and 253). This image had been "pre-processed" by others to bring out detail—notice how the sky is nearly white but clouds are still available (reproduction of the Figures in this application does not necessarily preserve the actual presence of the clouds). The prior art had taken it "as far" as its could but the subject was still too dark. FIG. 10b illustrates prior art brightening of the image by 60%. While image is brighter, the colors are badly faded and the stones have lost all their color. Some of the detail is also lost by this process alone. Note, even in the gray-scale rendering, the whitening of the "red" rock left of the stones and at the left extreme of FIG. 10b image. FIG. 10c is the brightened image of FIG. 10b with contrast set to 40%. Notice that the stones have, in areas, regained some color but not in other areas. Also notice how much more of the detail of the image is lost. FIG. 10d is the brightened image of FIG. 10b with saturation set to 15%. There is improved color that is "sort of right in a way" but it also adds artificial colors, such as some reds and yellows. Even in photos where not much correction is needed, manipulation of saturation for each dot ends up with different RGB ratios than were recorded. At best, one ends up with a compromise solution.

Applying the techniques of the present invention, in FIG. 10e the image range of 6 to 253 is linearly mapped to 0 to 255 to ensure the full dynamic range in the output image. In FIG. 10f, the scaling function of FIG. 8 was again applied for obtaining the superior, true color image with no loss of detail.

Forensic Flash—Virtual Detail Enhancement

Photo #3 (FIGS. 11a, 11b) Satellite

Figure 11A:
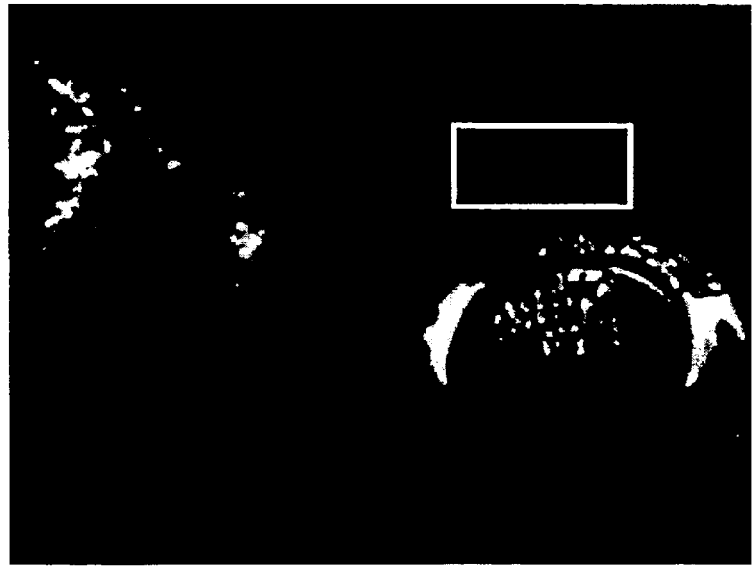
FIGS. 11a and 11b are respectively an original photo of a satellite and an enhanced photo according to the third embodiment of the present invention.

In FIG. 11a, the satellite is in the shadows and the surface is very dark. This often happens in space because of the extreme contrast in lighting. Important 'docking' holes cannot be seen. Using the forensic flash correction technique of the third embodiment, a window or box was selected within the dark area and the histogram approach used to build a correction graph suited for that area.

Figure 11B:
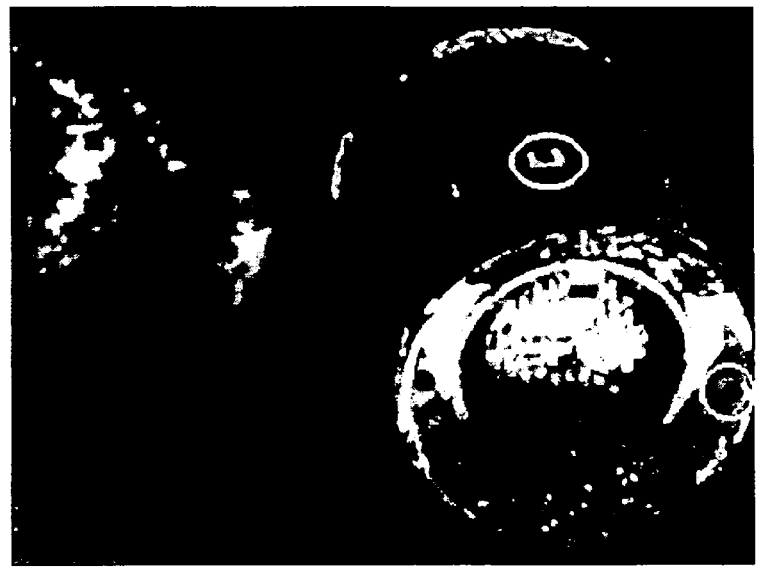

In FIG. 11b, the processed image now shows the detail in the dark area. The docking holes, marked with white circles, are now revealed.

Photo #4 (FIGS. 12a, 12b) Blimp

Figure 12A:
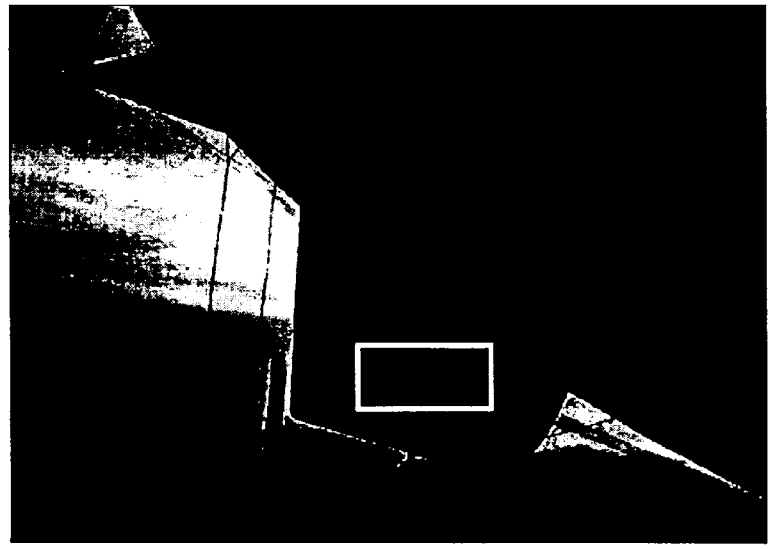
FIGS. 12a and 12b are respectively an original photo of a blimp and an enhanced photo according to the third embodiment of the present invention.

In the original image of FIG. 12a, the underside of the blimp is in the shadows. This often happens in photography when the lens is directed into the sky. Specifically, the identification markings cannot be seen as the tail is too dark.

Figure 12B:

Under the principles of the third embodiment, the tail area is selected and the histogram approach used to build a correction graph suited for that area. As a result, as shown in FIG. 12b, the processed image shows the lettering in the previously obscured, dark area. The blimp is now identified as COLUMBIA N3A.

Photo #5 (FIGS. 13a, 13b) Car Plate

Figure 13A:
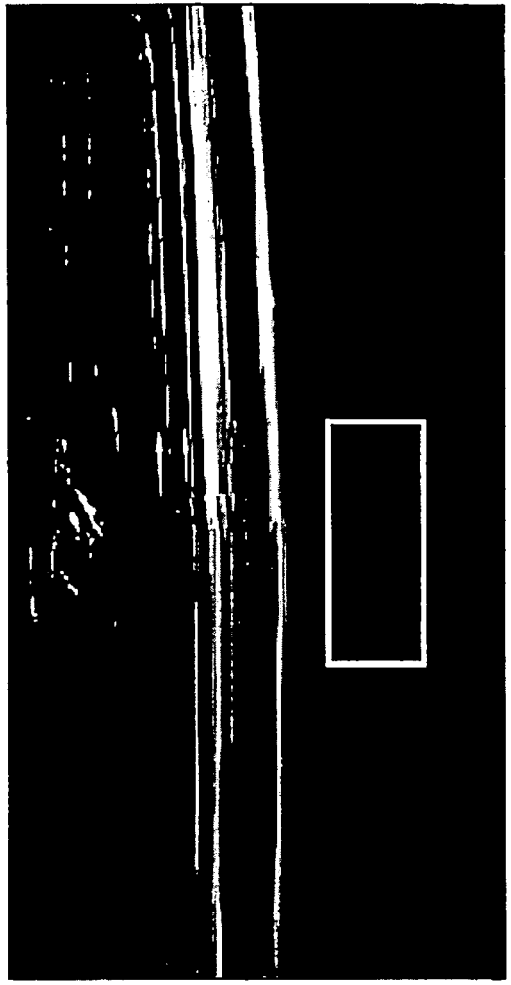
FIGS. 13a and 13b are respectively an original photo of a car license plate and an enhanced photo according to the third embodiment of the present invention.

In the original frame of FIG. 13a, the car's license plate is mostly shrouded in shadows. The car cannot be identified because the plate cannot be read. Using the third embodiment, the plate is selected and the histogram approach used to build a correction graph suited for that area.

Figure 13B:
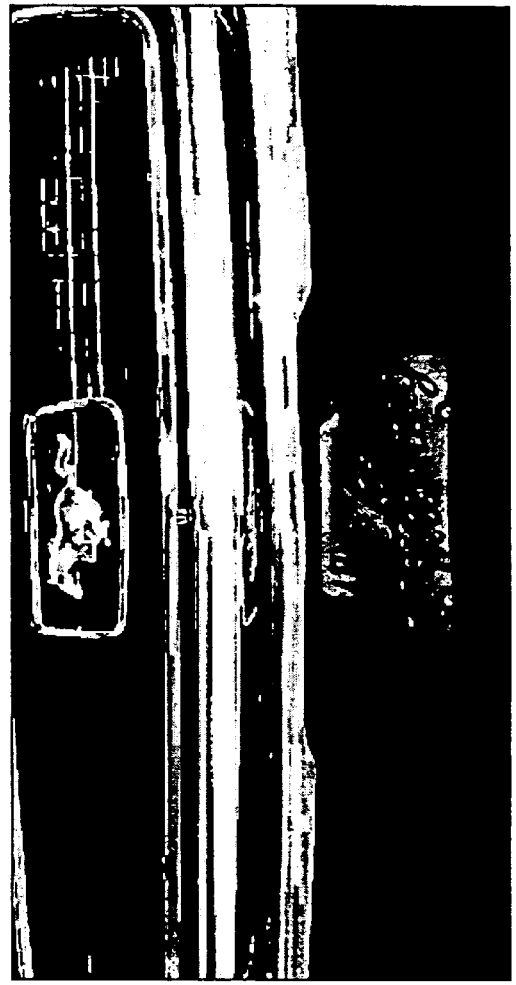

As a result, and referring to FIG. 13b, the processed image shows that the car does not have a normal plate at all but, instead, the words: Classic Mustang.

Photo #6 (FIGS. 14a, 14b, 14c) Tracks in the Snow

Figure 14A:
FIGS. 14a, 14b and 14c are respectively an original photo of skiers and ski tracks in the snow and two enhanced photos according to the third embodiment of the present invention, each using a different portion of the photo to build the enhancement.

In FIG. 14a, there are two people skiing. Their tracks are identifiable, but subtle. Using the forensic flash correction technique of the third embodiment, a window or box was selected within the overexposed area of the tracks in the snow and the histogram approach used to build a correction graph suited for that area.

Figure 14B:

In FIG. 14b, the processed image now shows the detail in the overexposed area. The tracks in the snow are distinctly visible.

Figure 14C:
Figure 15A:
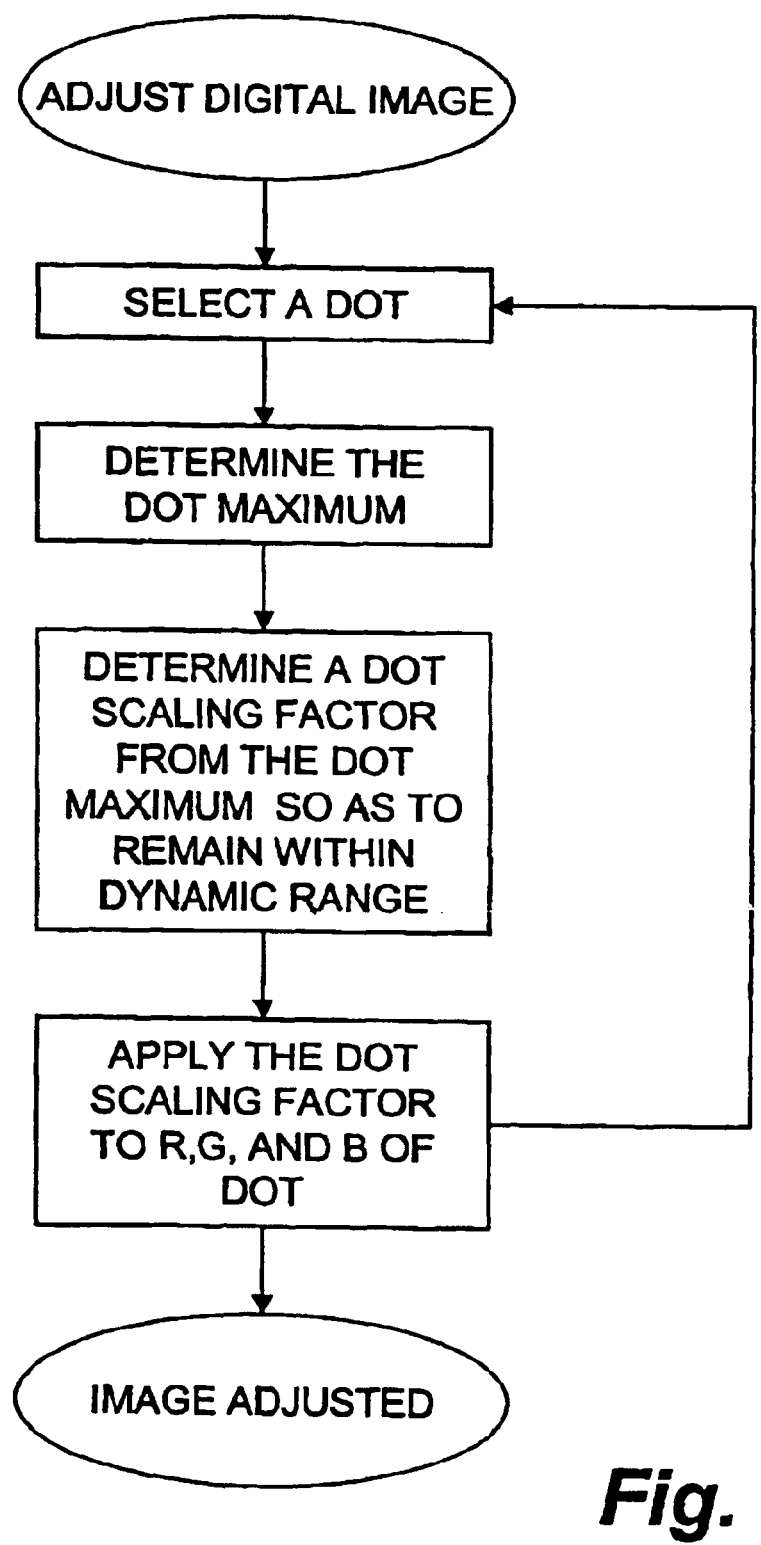
FIG. 15a is a flow chart of one embodiment of the invention illustrating determination of scaling factors.
Figure 15B:
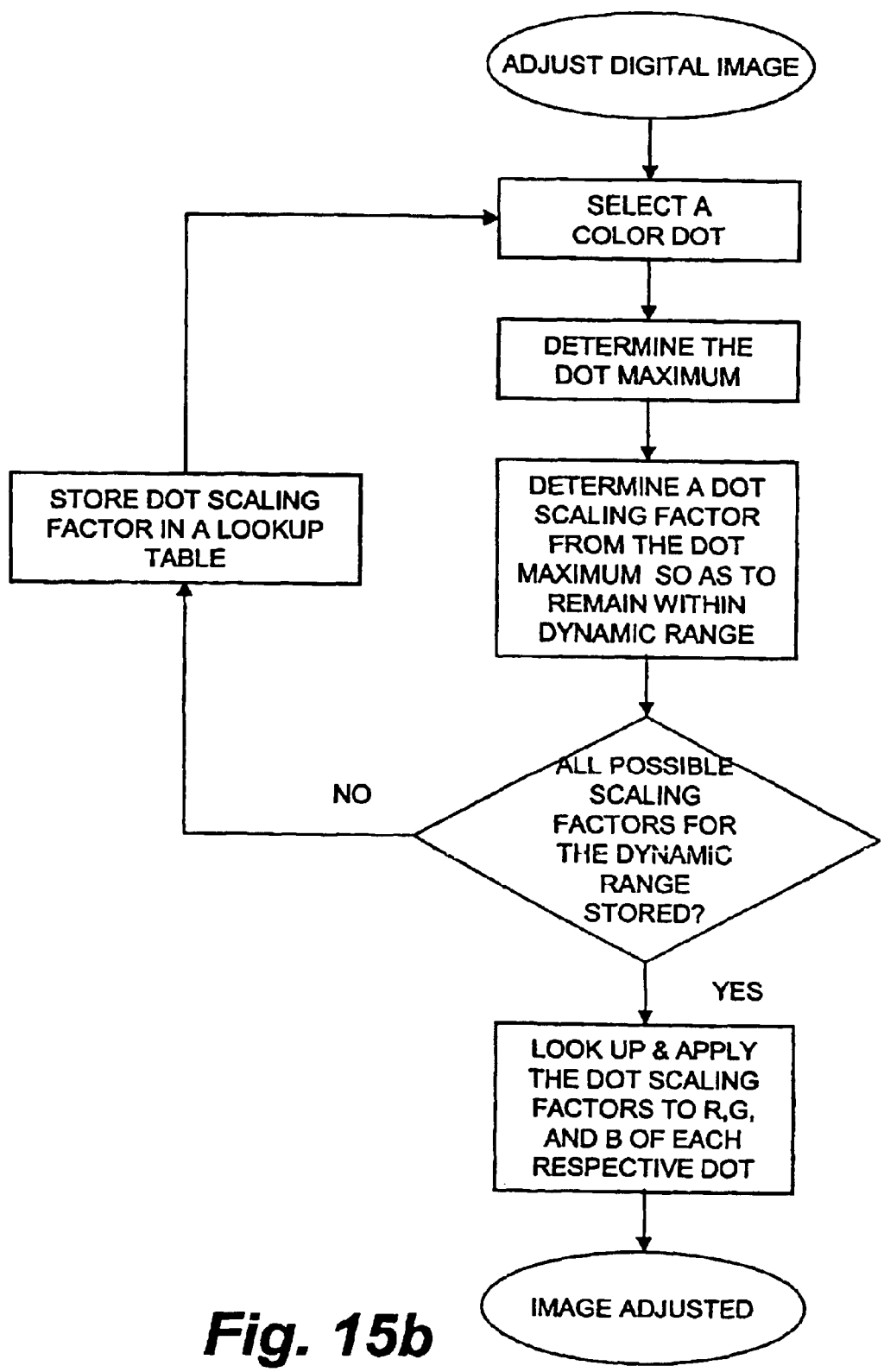
FIG. 15b is a flow chart of another embodiment of the invention illustrating determination of scaling factors and storing them in a lookup table.
Figure 15C:
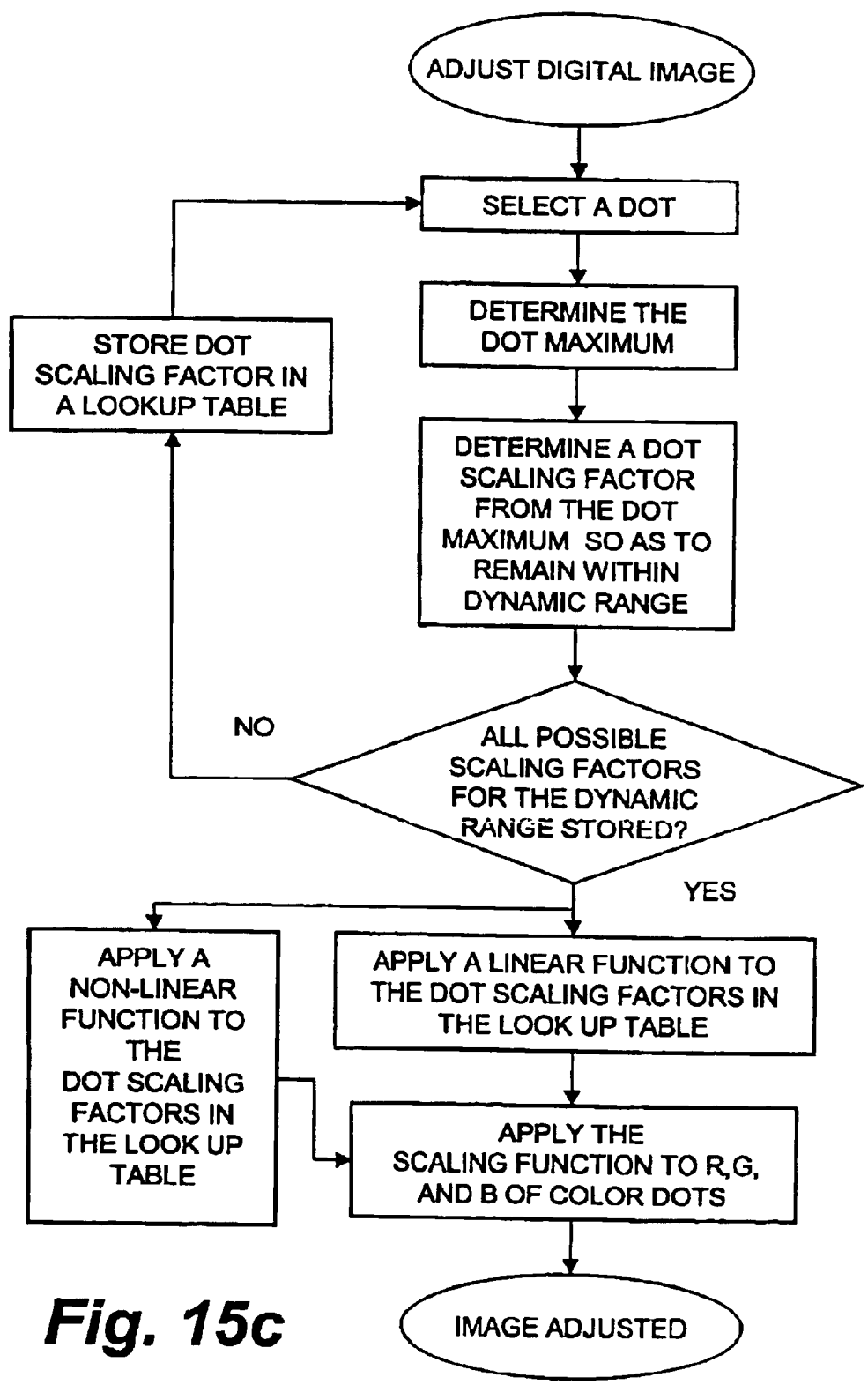
FIG. 15c is a flow chart of another embodiment of the invention illustrating determination of scaling factors and application of a function to adjust the color dots.
Figure 16:
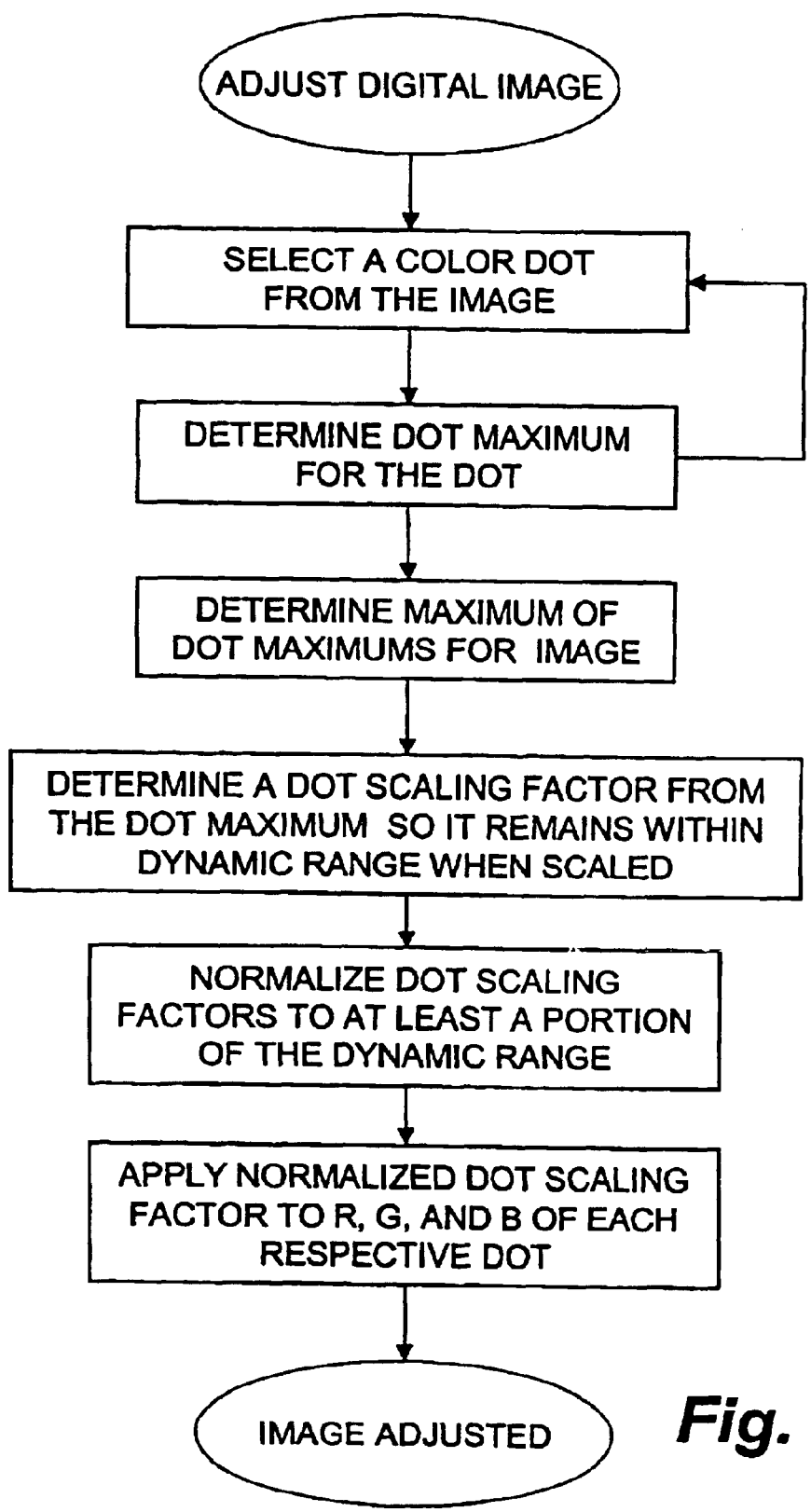
FIG. 16 is a flow chart of another embodiment of the invention illustrating a normalization process for the dots to at least a portion of the dynamic range such as that set forth in the third embodiment.
Figure 17:
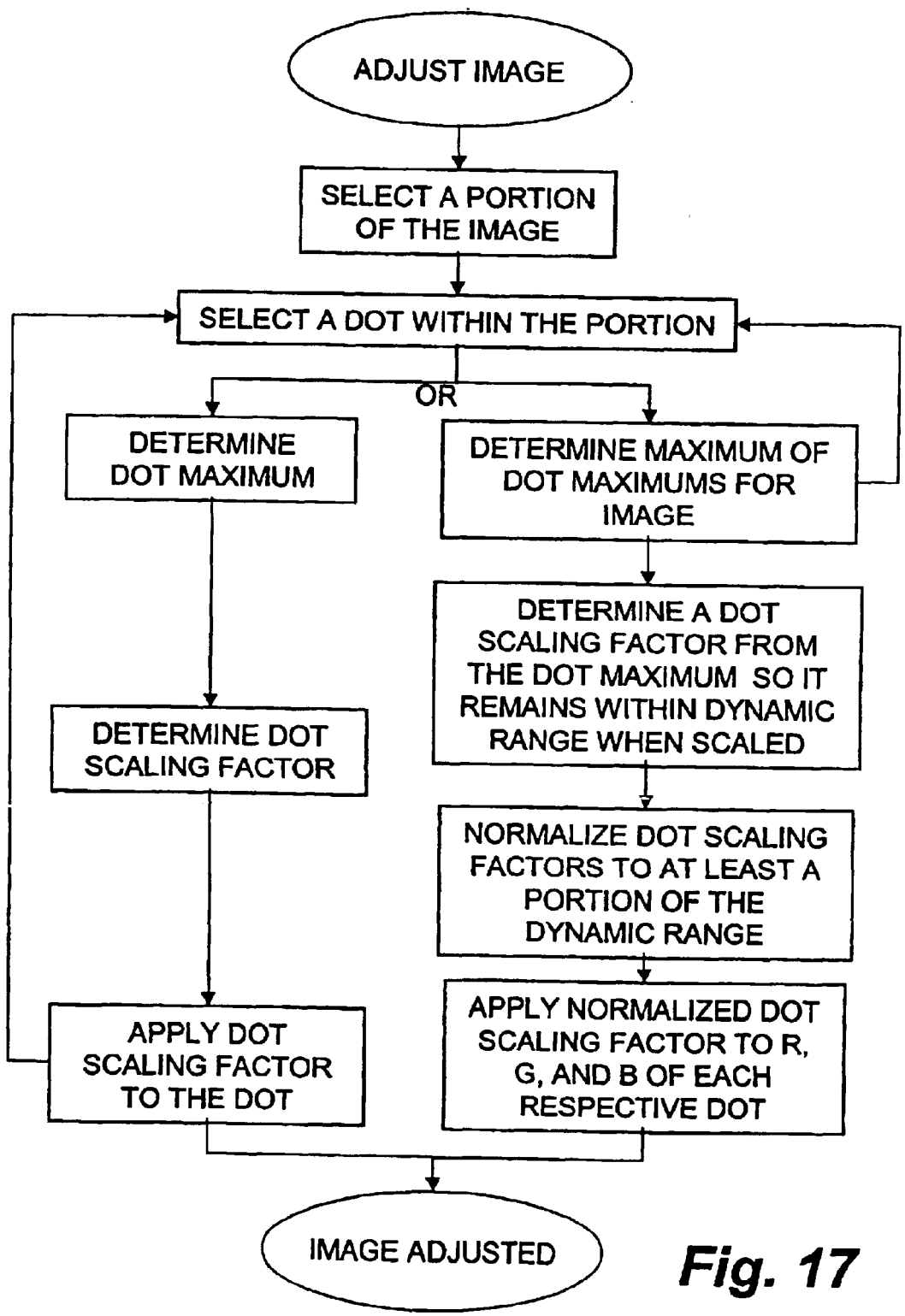
FIG. 17 is a flow chart of another embodiment of the invention illustrating a selection of a portion of the image for adjustment and two implementations of the invention to adjust the image.

Similarly, a window or box was selected in the dark area of the face of the skier in the photograph. FIG. 14c is the result of the histogram approach used to build a correction graph uniquely suited to this area of the photo. The features of the skier are more clearly visible than in the original photo shown in FIG. 14a.

SUMMARY

The key concepts are here expressed as the combination of the following six factors: correcting in RGB color space, the correction graph; the definition of the correction axes; constraint of domain and range to the system's dynamic range; properties of the graph; and application of the same correction factor to each of R,G and B in the triplet.

The correction must be applied to the RGB color space to maintain true color. Any correction graph can be used that embodies the above characteristics. Both the input and the output axes represent the maximum of the RGB triplet. The input is the maximum of the RGB triplet under consideration and the output corresponds to the maximum of the RGB triplet that is calculated as a result of virtual true color light amplification. The correction is constrained to the dynamic range. This means that the strength of the calculated dot is constrained to the dynamic range. Any graph that can be plotted within the constraints can be used for the process. The properties of a particular graph will affect the emphasis of the correction. Again, all three of the RGB values must be multiplied by the scaling factor derived from the graph. A given point on the graph has an input and output value. The correction equals the ratio (division) of these two and all three of the RGB triplet values are multiplied by this ratio of output to input.

The result of these considerations is a suite of processes all of which preserve the essential color of each and every dot in the input digital image while varying the effective light gathering power which can easily be on a dot to dot basis.

All that differs between the above embodiments is to vary the graph within the imposed constraints. With virtual true color light amplification, a new and useful result is dependent only upon identifying an image enhancing need and identifying a reasonable graph to fit that need.

Correction of Faded Images

In a preferred aspect of the invention there is an additional automatic correction which can be applied to supplied images which are degraded, those that look faded but lack the natural chaos in the degradation. Through investigation, it appears to applicant that this is a common problem of images. The problem is that there appears to be a constant triplet of gray added to these classes of photograph. Grays are represented by a triplet where R, G, and B at any strength have the same value. Examples of grays are:

| | |
|---|---|
| Bright White | (255, 255, 255) |
| White | (200, 200, 200) |
| Light Gray | (150, 150, 150) |
| Gray | (100, 100, 100) |
| Dark Gray | (50, 50, 50) |
| Black | (0, 0, 0) |

Images, such as a red beach ball, might be represented by a triplet (150, 50, 50) and thus look pink instead of being truly red at (100, 0, 0). The Virtual True Color Light Amplification process described above and in co-pending application Ser. No. 09/548,755 cannot correct these photos as it assumes that the input (150, 50, 50) is the right color to begin with. A non-faded photograph is likely to contain a representation of vibrant color, being that one or more of R, G, or B is zero. Some examples are:

| | |
|---|---|
| Bright Red | (255, 0, 0) |
| Bright Yellow | (255, 255, 0) |
| Bright Blue | (0, 0, 255) |
| Dark Red | (63, 0, 0) |
| Dark Yellow | (63, 63, 0) |
| Dark Blue | (0, 0, 63) |

Mathematically, the existence of vibrant color means that the smallest strength values for R, G or B encountered in the image should be zero, or near zero. In faded images, the smallest values are non-zero which applicant suggests are artificial and represent the addition of gray throughput.

In order to remove this artificial addition of gray from the image the assumption is made that the smallest numbers encountered in the image would actually have been zeros if there had been no degradation or distortion. An offset value, x, is determined so as to reduce the gray to zero. This offset (x, x, x) is subtracted from each of R, G and B.

Figure 18A:
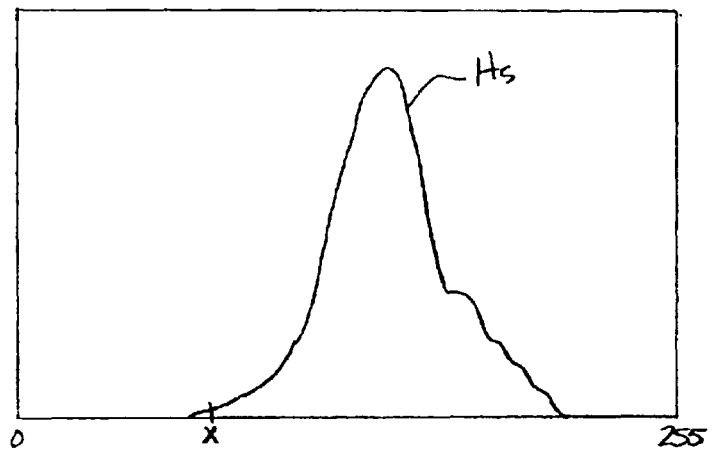
FIGS. 18a and 18b are respectively a first histogram of a supplied image which is faded or has an excessive gray present, and a second histogram of an image which has been offset to remove gray according to an automatic correction embodiment of the present invention.
Figure 18B:
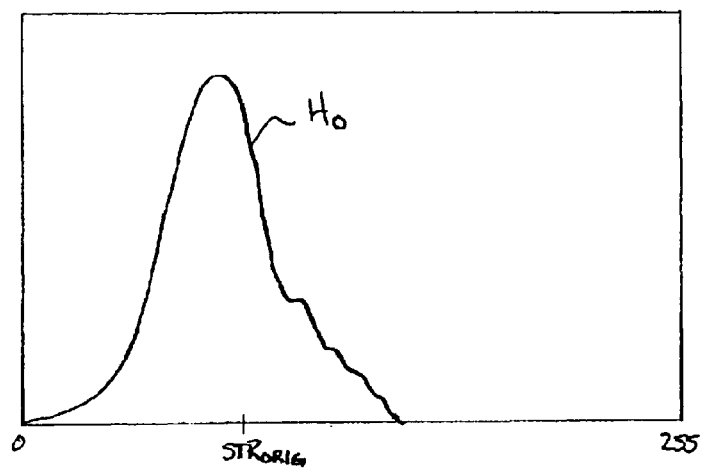

With reference to FIGS. 18a and 18b, to automatically determine the value of the offset x, a first histogram of all the independent values of R, G and B is made of the image. To reject outliers, a majority of the population of color dots is retained by setting the offset x at a clipping threshold, rejecting 0.1%–0.5% of the population of strength values which is equivalent to retaining 99.9 to 99.5% of the values. The difference between the strength value at the clipping threshold and the minimum of the dynamic range (typically zero) is selected as the offset value x. As shown in FIG. 18b, the removal of (x, x, x) from each R, G and B (R−x,G−x, B−x) shifts the histogram to the left which is also the minimum strength of the dynamic range. Essentially offset x is shifted to zero which has the result of making the supplied image appear somewhat darker. Basically for faded images, there is an advantage in first darkening an image before seeking to brighten or adjust the supplied image.

Automatic Strength Selection

If the supplied image is not faded or otherwise contain an inappropriate amount of gray, then the supplied image becomes an original image for brightening. If there is gray in the supplied image, it is preferable to automatically offset the strength values of the supplied image to arrive at a new image, an original image, for brightening. Note that when the offset approach is applied, it purposefully results in color distortion as it manipulates the strength of each of R, G and B in different proportions.

The true color brightening or light amplification techniques, implemented herein, as set forth in the co-pending application and reproduced substantially above, brighten images based on a function selected by the user or pre-selected for correction at some pre-determined amount, all without exceeding the dynamic range and also without color distortion. However, aesthetics are rarely that simplistic or universally applicable. Herein, applicant has also sought means to automate the brightening process and thereby relieve the user, typically a novice, of the need to assess an ideal brightening function.

An automatic strength selection process of the present invention can be applied to almost all photographs with little harm. The process is based on the assumption that there is an average strength value applicable to most photographs which is pleasing to the eye. Empirical study for this applicant has determined that there can be a target average strength which is suitable to most photographs. While this is based substantially on aesthetics, a range of target average strength can be usefully between 50 and 65% of the dynamic range. A different target may be chosen by others, but nevertheless, an infinite number of different images can be corrected to a target average strength once selected.

In correcting an image to a target average strength, applicant has avoided complex polynomial analysis where one might specify a different polynomial function for every image of an infinite possible number of images. Instead, while acknowledging that a preferred function for correcting a range of strengths present in an image can be a non-linear function, images are corrected to a more true-to-life color through simple interpolation of the results between a given function and a linear identity function (both of which are shown in FIG. 8) to determine what scaling factors will produce an image at the target strength value. Herein for simplicity of language, interpolation is intended to include extrapolation, both of which are merely estimates of a value from a function where other values of that function are known.

In an illustrative embodiment, an improved image enhancement process adapts the non-linear and continuous virtual iris curve to automatically obtain scaling factors for correcting the color if a digital image. Such a curve is shown in FIG. 8 as introduced in co-pending application Ser. No. 09/548,755. Other specialized curves illustrated in FIGS. 4 and 6. The form and selection of the constants for the function are pre-determined, which does not adapt to the infinite variety of images. Applicant has determined a method for automatically adapting the function on an image by image basis.

Figure 19:
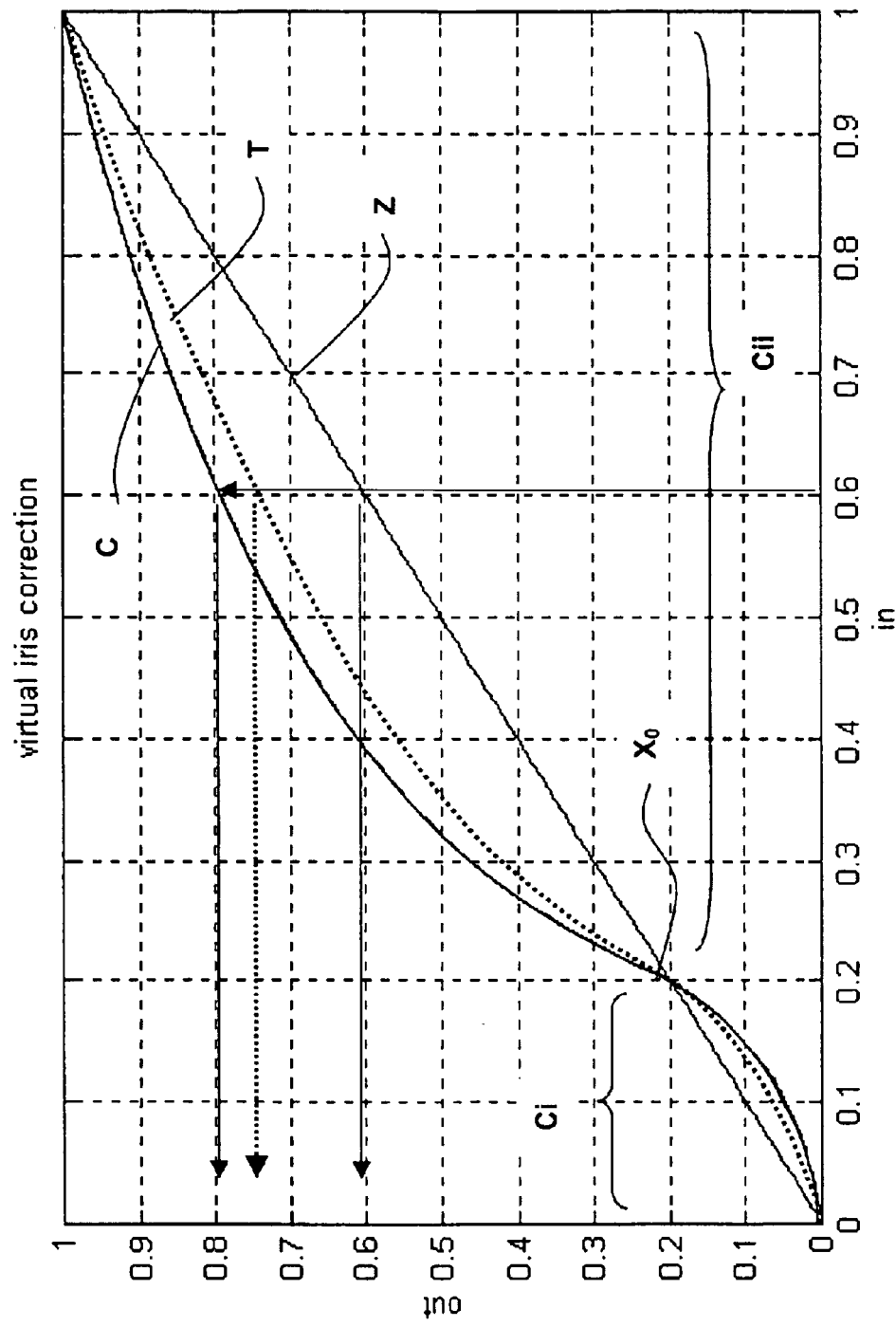
FIG. 19 is a graph according to FIG. 8 further illustrating a variety of scaling functions superimposed over an identity function or unity diagonal, one non-linear curve representing a nominal correction which can be adjusted to an interpolated target function which better produces an aesthetically pleasing enhancement through the brightening of the image.

With reference to FIG. 19, herein, a 100% correction refers to direct application of a form of the virtual true color light amplification function to correct an image as shown as function C in FIG. 19 (also as FIG. 8). As stated, while the image is brightened and the color may remain true, this 100% correction may not provide an optimal aesthetic effect. Instead, an optimal or target correction has been found empirically to lie between the 100% correction and no correction at all, represented by function T. An identify function is a 0% correction, where no brightening is performed at all, illustrated as the diagonal linear line in FIG. 8.

Figure 20:
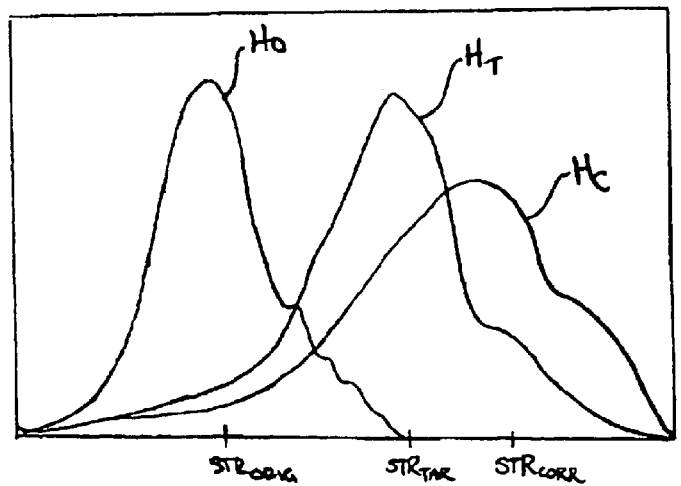
FIG. 20 illustrates three comparative histograms including a second histogram Ho of an offset image forming an original image for brightening according to FIG. 18b, a third histogram Hc of the corrected image at 100% application of the scaling function C according to FIG. 19, and a fourth histogram $H_T$ of a final corrected image at the interpolated and fractional correction of the scaling function T to achieve a target average strength.

With reference also to FIG. 20, simply, for establishing the form of function T, a second original histogram Ho of the strengths of the dot maximum for each color dot in the original given image is obtained and an original average strength $STR_{ORIG}$ is established. A third correction histogram Hc is obtained after a 100% color amplification (function C) is applied to the original histogram and to establish a corrected average strength $STR_{CORR}$; this correction being made according to the invention so as ensure maintenance of the colors of the original given image and within the dynamic range. The corrected average strength $STR_{CORR}$ is compared to a target average strength $STR_{TAR}$ and scaling factors of the color correction are adjusted accordingly and while not a required step, a fourth histogram $H_T$ can be established.

Mathematical operations are preferably performed at the histogram level representing a set of values of individual primary colors R,G and B. Using a histogram, one scaling factor can determined which corresponds to one dot maximum which potentially represents a very large number of like color dots, all of which have the same dot maximum. This enables an image having millions of color dots to have a corresponding, manageable and computationally efficient 256 scaling factors representing the whole image.

The original image may be as received or as previously adjusted using the faded image correction having been shifted by the offset x.

In this embodiment, the first histogram Hs of a supplied image (FIG. 18a) is shifted by offset x. A second and original histogram Ho (of dot maximums FIG. 18b) of this new original image can be determined as the beginning point for brightening the image. This new offset image forms the original image used for automatic strength selection as follows.

With reference to FIGS. 19 and 20, an average strength of the offset original image, $STR_{ORIG}$, can be calculated from the histogram Ho (FIG. 18b and FIG. 20). An identity function applied to this histogram Ho would result in 0% correction and all the same strength values as in this original image.

The virtual iris enhancement function C is then applied at the 100% correction for applying corresponding scaling factors selected from function C for each dot maximum of the histogram Ho, the scaling factor being applied to each of the R,G and B of each color dot so as to maintain the true color of the color dot from the original image.

The third corrected histogram Hc can be created of the corrected image. Clearly, the formation of this and other histograms is purely a mathematical concept and no representation like FIGS. 18a, 18b and 20 need be produced. A corrected average-strength, $STR_{CORR}$, is determined from the values representing the corrected histogram Hc.

Where the target average strength, $STR_{TAR}$, has been determined empirically, for example such as at 158 of a dynamic range of 255 (58%) we can determine whether the 100% correction was too aggressive and if a fractional correction should be applied. A fractional correction % CORR or interpolation constant can be determined through linear interpolation where, $$\% \ CORR = \frac{(STR_{TAR} - STR_{ORIG})}{(STR_{CORR} - STR_{ORIG})} * 100\%.$$

While the interpolation constant can be applied as directly calculated from the interpolation, the variability of images can result in unpredictable results. Accordingly, correction to the image can be constrained so that images are not corrected more than 80% as a safeguard to the automatic process. Accordingly, for this embodiment and the function C set forth in FIGS. 8 and 19, it is assumed that correction about 100% is too aggressive and should be bounded by about an 80% interpolation tempered with a lesser and fractional correction. In mathematical terms, the constraints are:

% CORR=100% correction-too aggressive thus 100% % CORR>80%=80%

0%<% CORR 80%=% CORR

% CORR 0%=0%

The virtual iris curve or function C is non-linear but the interpolated displacement from 100% of the virtual iris curve to the interpolated or target function T is a linear interpolation. It is in this sense that the linear interpolation is performed on a non-linear functions.

EXAMPLE

A brightly distorted and supplied image can be represented in a histogram Hs as in FIG. 18a. To determine the offset x, we take the value at 0.1% on the histogram, here x=104 for a dynamic range of 0–255. The triplet (104, 104, 104) is subtracted from each R, G, and B dot in the image and the second histogram Ho is created representing an original image, as in FIG. 18b and reproduced on FIG. 20.

Now the original image is brightened without distortion of the colors. The mean, or average strength, of the original image, $STR_{ORIG}$, is found to be 95, being a fractional 0.37 or 37% of the dynamic range With reference to FIG. 19, the virtual iris curve is applied to the original image. Assume there were 6400 color dots in the image having dot maximum strength values of strength 61. Application of the identity function (0% correction) would maintain all 6400 values as a strength value of 61, that is the image would be unchanged. When the virtual iris non-linear curve is applied to the image and a third correction histogram Hc is created, the 6400 values at an original strength 61 are scaled to the value corresponding on the full or 100% virtual iris curve, say a n amplified or brightened strength value of 79. Only one scaling factor 0.79/0.61= 1.295 need be calculated for each dot maximum which is applicable equally to each of R,G, and B in each of the 6400 dots in the image which all have the same strength. Similar adjustments are made to all strength levels within the dynamic range, scaling factors from the function C being applied to each dot maximum represented in the histogram Ho.

From the correction histogram Hc of corrected strength values, a new mean, or corrected average-strength, $STR_{CORR}$, is determined to be 170, being a fractional 0.67, or 67% of the dynamic range. We now know:

$STR_{ORIG}$=95 (37%), $STR_{CORR}$=170 (67%) and $STR_{TAR}$=158 (58%)

To determine the automatic correction factor, % CORR, for the image we can apply the % CORR formula as follows:

% CORR=(($STR_{TAR}$-$STR_{ORIG}$)/($STR_{CORR}$-$STR_{ORIG}$))*100%

% CORR=((158-95)/(170-95))*100%

% CORR=(63/75)*100=84%

The interpolated constant % CORR represents the shift in the scaling factor between the identify function Z and function C. Accordingly, for the target correction, for all 6400 dots at strength 0.61 the appropriate scaling factor is no longer 1.295 as determined at the 100% correction but is now an interpolated target scaling factor TSF which is established for each original dot maximum and is determined as follows:

$$TSF = \frac{(\% \ CORR * (DotMax_{CORRECTED} - DotMax_{ORIGINAL}) + DotMax_{ORIGINAL})}{(100 * DotMax_{oxORIGINAL})}$$

where: $DotMax_{CORRECTED}$ represents the corrected dot maximum, and $DotMax_{ORIGINAL}$ represents the original dot maximum.

Accordingly the target scaling factor TSF for dot maximums at 0.61 of the dynamic range is now (0.84*(0.79–0.61)+0.61)/0.61=1.248. Similar target scaling factors are determined for each dot maximum strength in the original image, adjusted to 84% of the 100% correction curve scaling factors. Accordingly, scaling factors at 84% of the Virtual Iris curve are applied to the original image, represented by function T, automatically creating an adjusted image having eye-pleasing color that is not distorted.

This example image turns out be to already be a fairly bright image and one can further apply an arbitrary constraint to avoid overbrightening—judged solely on an esthetics basis, and thus where % CORR>80%, then % CORR= 80%

This image corrected at 80% will result in an average strength in this case of 155. The scaling factors is therefore further suppressed slightly, the resulting scaling factor for a dot maximum at 61 being (0.80*(0.79–0.61)+0.61)/0.61= 1.236.

Virtual Iris Functions FIGS. 8, 19

The form of the function is specified empirically. The preferred virtual iris curve or function C of FIGS. 8 and 19 is created by applying two separate non-linear functions to the no-correction line, shown here as an exponential and a logarithmic curve. Similarly, other functions include squared and square root functions. Other functions include suitably bounded polynomials and stepwise linear functions.

A pleasing correction is possible using the function or functions as set forth in FIG. 19 wherein a first exponential function Ci ends where the second logarithmic function Cii begins. This is a predetermined anchor strength value $x_0$ intersecting the identify function or no-correction line Z and which is intermediate the minimum and the maximum of the dynamic range. The intersection $x_0$ has been determined empirically and for a dynamic range of 256 with the minimum at 0, $X_0$ is set approximately as follows:

$x_0=0$ for a high quality image $x_0=2$ for a clean image $x_0=25$ for a noisy image The first function Ci is applied to the darkest area of the image between $DR_{min}$ as the minimum of the dynamic range and the anchor strength value $X_0$, and which minimized an effect on the darkest area. The curve is exponential and has the form of $f(x)=a+10^{bx}$ where, $DR_{min}$ $x<x_0$, and $f(DR_{min})=DR_{min}$; $f(x_0)=x_0$. Typically $DR_{min}$ is zero and the limits are 0 $x<x_0$ and accordingly $f(0)=0$.

The second function Cii is applied to the brighter areas of the image between the anchor strength value $X_0$ and $DR_{max}$ as the maximum of the dynamic range and has the effect of imitating the iris so that the output image happens to more closely resemble one's visual memory of the experience. This curve is logarithmic and has the form of $f(x)=a+\log_{10}(bx)$ where x0 $x<DR_{max}$ so that $f(x_0)=x_0$ and $f(DR_{max})=DR_{max}$. Typically a normalized $DR_{max}$ is unity and the limits become $x_0$ $x<1$ and accordingly $f(1)=1$.

This invention has been described in detail with reference to particular embodiments thereof, but it will be understood that various other modifications can be applied within the spirit and scope of the invention. For example, different target average strengths may be preferred by others, different true color correction functions C can be applied as described herein, being linear, non-linear of combinations thereof. Further, many methodologies for computation analysis can be implemented to maximize efficiencies. Herein, histograms are applied to minimize the number of intensive calculations which is particularly important as dynamic range increases from 256, to 1024 and upwards, however, other less efficient (color dot-by-dot) or other more efficient techniques can be applied and still achieve adjustment of an image without departing from the scope of the invention.

The embodiments of the invention for which an exclusive property or privilege is claimed are defined as follows:

1. A method for automatic adjustment of the color of a digital original image for forming a digital adjusted image, the original image being a whole of a supplied digital image or a portion thereof and being formed of a plurality of color dots, each dot having at least three independent values representing the strength of the three primary colors R, G, and B, each strength value lying between a minimum and a maximum of a dynamic range, comprising:

determining an original dot maximum of the R, G, or B strength values in RGB color space for each color dot within the original image for establishing an original histogram of original dot maximums for the plurality of color dots within the original image;

establishing an original average strength of the original histogram;

amplifying each of the original dot maximums by selecting a correcting scaling factor from a continuous scaling function and applying the correcting scaling factor for each original dot maximum which scales the original dot maximum to a scaled dot maximum which is less than or equal to the maximum of the dynamic range;

establishing a corrected average strength of the original dot maximums from a corrected histogram of the scaled dot maximums;

comparing the original average strength to a target average strength;

determining an interpolation constant between an identity scaling factor of 1 and the correcting scaling factor for each original dot maximum by interpolation using the target average strength, the corrected average strength and the original average strength for each dot maximum; and creating an adjusted image without color distortion by applying the interpolation constant to modify the correcting scaling factor for each original dot maximum and establishing a target scaling factor which is applied to each color dot's R, G and B strength values so that a histogram of the adjusted image has the target average strength and that the ratios of the strength values between R, G and B for the color dot remain the same after scaling as they were before scaling.

2. The method of claim 1 wherein the scaling function is non-linear and continuous.

3. The method of claim 1 wherein the supplied image is corrected prior to adjustment of the color of the digital original image for forming the digital adjusted image further comprising:

establishing a supplied histogram of R, G, or B strength values for each color dot within the supplied image;

determining a offset strength value between the minimum of the dynamic range of the system and a minimum threshold strength value of the supplied histogram;

subtracting the offset strength value from each R, G, and B value for forming the original image for automatic correction thereof.

4. The method of claim 3 wherein minimum threshold strength value of the supplied dot minimums is the minimum strength for a majority of the color dots.

5. The method of claim 4 wherein the majority of the color dots is between 99% and 100% of the color dots.

6. The method of claim 5 wherein the majority of the color dots is between 99.5 and 99.9% of the color dots.

7. The method of claim 1 where the target average strength is selected empirically.

8. The method of claim 7 where the target average strength is between 50 and 65% of the dynamic range.

9. The method of claim 8 where the target average strength is about 58% of the dynamic range.

10. The method of claim 1 where the continuous scaling function is a polynomial function.

11. The method of claim 1 where the continuous scaling function has a form $(x)=a+10^{bx}$ and $DR_{min} \leq x<x_0$, where $DR_{min}$ is the minimum of the dynamic range and $f(0)=0$ and $x_0$ is an anchor strength value intermediate the minimum and the maximum of the dynamic range and $f(x_0)=x_0$;

wherein a and b are constants; and x is a dot maximum strength value.

12. The method of claim 11 where the continuous scaling function has a form $f(x)=a+\log_{10}(bx)$ and $x_0 \leq x<DR_{max}$, between the anchor strength value $x_0$ $DR_{max}$ is the maximum of the dynamic range where $f(x_0)=x_0$ and $f(DR_{max})=DR_{max}$.

13. The method of claim 1 wherein the interpolation constant is determined as follows:

$$\% \ CORR = \frac{(STR_{TARGET} - STR_{ORIGINAL})}{(STR_{CORRECTED} - STR_{ORIGINAL})} \times 100$$

where $STR_{TARGET}$ is the pre-determined target average strength value, $STR_{ORIGINAL}$ is the original average strength value, $STR_{CORRECTED}$ is the corrected average strength value, and % CORR is the interpolation constant expressed as a percentage that the target scaling factor is between the corrected scaling factor and the identity scaling factor.

14. The method of claim 13 wherein the target scaling factor for each original dot maximum is determined as follows:

$$TSF = \frac{(\% \, CORR * (DotMax_{CORRECTED} - DotMax_{ORIGINAL}) + DotMax_{ORIGINAL})}{(100 * DotMax_{ORIGINAL})}$$

where:
$DotMax_{CORRECTED}$ represents the corrected dot maximum;
$DotMax_{ORIGINAL}$ represents the original dot maximum.

15. The method of claim 13 wherein
if % CORR>80%, then % CORR=80%;
if 0%<% CORR<80%, then % CORR=% CORR; and
if % CORR<0%, then % CORR=0%.

16. A method for automatic adjustment of the color of a digital image or a portion thereof, the image being formed of a plurality of color dots, each dot having at least three independent values representing the strength of the three primary colors R, G, and B, each strength value lying between a minimum and a maximum of a dynamic range, comprising:

establishing an original histogram of dot maximums for the plurality of color dots within the original image and an original average strength thereof;

amplifying each dot maximum with a scaling factor selected from a continuous scaling function to obtain a scaled dot maximum which is less than or equal to the maximum of the dynamic range;

establishing a corrected histogram of scaled dot maximums and a corrected average strength thereof;

interpolating a target scaling factor from a target average strength, the corrected average strength and the original average strength for each dot maximum; and creating the adjusted image without color distortion by applying the target scaling factors to each color dot's R, G and B strength values so that a histogram of the adjusted image has the target average strength and that the ratios of the strength values between R, G and B for the color dot remain the same after scaling as they were before scaling.

17. The method of claim 16 wherein the image is corrected prior to adjustment of the color further comprising:

establishing a supplied histogram of R, G, or B strength values for each color dot within the supplied image;

determining a offset strength value between the minimum of the dynamic range of the system and a minimum threshold strength value of the supplied histogram; and subtracting the offset strength value from each R, G, and B value for forming the original image for automatic correction thereof.

* * * * *